(12) United States Patent
Nicholson

(10) Patent No.: US 8,882,597 B2
(45) Date of Patent: Nov. 11, 2014

(54) HYBRID SEPARABLE MOTION CONTROLLER

(75) Inventor: Charles Nicholson, San Francisco, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 226 days.

(21) Appl. No.: 13/115,770

(22) Filed: May 25, 2011

(65) Prior Publication Data

US 2012/0302347 A1 Nov. 29, 2012

(51) Int. Cl.
*A63F 9/24* (2006.01)
*A63F 13/20* (2014.01)

(52) U.S. Cl.
CPC .......... *A63F 13/06* (2013.01); *A63F 2300/10* (2013.01); *A63F 2300/1043* (2013.01); *A63F 2300/105* (2013.01); *A63F 2300/1087* (2013.01)
USPC ................................. 463/37; 463/36; 463/39

(58) Field of Classification Search
CPC ............... A63F 13/06; A63F 2300/10; A63F 2300/105; A63F 2300/1043
USPC ................................. 463/36, 37, 39
See application file for complete search history.

(56) References Cited

U.S. PATENT DOCUMENTS

| 4,279,433 | A | * | 7/1981 | Petaja | 280/605 |
| 5,877,686 | A | * | 3/1999 | Ibey et al. | 340/571 |
| 6,020,818 | A | * | 2/2000 | Chittenden | 340/568.6 |
| 7,034,690 | B2 | * | 4/2006 | Chaco | 340/573.1 |
| 8,506,140 | B2 | * | 8/2013 | Edmisten | 362/486 |
| 8,536,990 | B2 | * | 9/2013 | Collins et al. | 340/286.07 |
| 8,604,917 | B2 | * | 12/2013 | Collins et al. | 340/286.07 |
| 2011/0118032 | A1 | * | 5/2011 | Zalewski | 463/39 |
| 2012/0202597 | A1 | * | 8/2012 | Yee et al. | 463/37 |
| 2013/0102391 | A1 | * | 4/2013 | Kaldahl | 463/37 |

* cited by examiner

*Primary Examiner* — Michael Cuff
(74) *Attorney, Agent, or Firm* — Martine Penilla Group, LLP

(57) ABSTRACT

A hybrid separable motion controller is provided. The controller includes a first portion including a first handle, a first medial connector defined along a length of the first handle, and a first geometric object defined at an end of the first handle. The controller further includes a second portion including a second handle, a second medial connector defined along a length of the second handle for coupling to the first medial connector, and a second geometric object defined at an end of the second handle. The first portion or the second portion includes a connection sensor for determining whether the controller is in a connected configuration or a disconnected configuration.

21 Claims, 28 Drawing Sheets

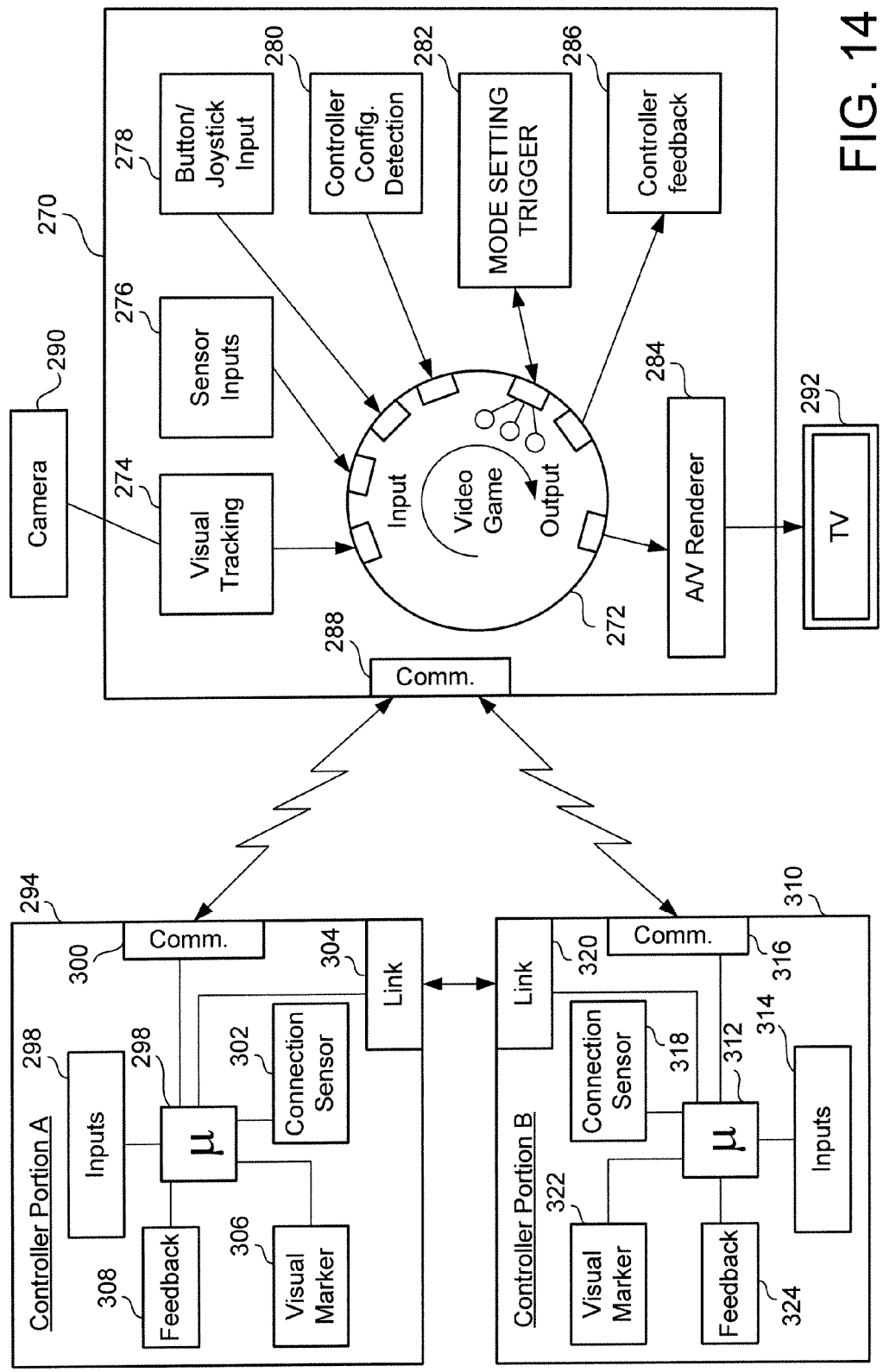

HYBRID SEPARABLE MOTION CONTROLLER

RELATED APPLICATIONS

This application is related to U.S. patent application Ser. No. 11/588,779, entitled "SYSTEM AND METHOD FOR INTERFACING WITH A COMPUTER PROGRAM, filed Oct. 26, 2006, by inventors Richard Marks, Hrishikesh Deshpande, and Gary Zalewski, which claims priority to U.S. Provisional Patent Application No. 60/730,659, entitled "SYSTEM AND METHOD FOR INTERFACING WITH A COMPUTER PROGRAM," filed Oct. 26, 2005, by inventor Richard Marks, and to U.S. patent application Ser. No. 12/259,181, entitled "DETERMINING LOCATION AND MOVEMENT OF BALL-ATTACHED CONTROLLER," filed Oct. 27, 2008, by inventors Anton Mikhailov and Richard Marks, and to U.S. patent application Ser. No. 12/623,352, entitled "CONTROLLER FOR INTERFACING WITH A COMPUTING PROGRAM USING POSITION, ORIENTATION, OR MOTION," filed Nov. 20, 2009, by inventors Xiadong Mao and Noam Rimon, the disclosures of which are herein incorporated by reference in their entirety.

BACKGROUND

1. Field of the Invention

The present invention relates to methods and systems for providing thermal feedback via a controller device interfacing with an interactive program.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

It is in this context that embodiments of the invention arise.

SUMMARY

Embodiments of the present invention provide methods and systems for providing a hybrid separable motion controller interfacing with an interactive program. It should be appreciated that the present invention can be implemented in numerous ways, such as a process, an apparatus, a system, a device or a method on a computer readable medium. Several inventive embodiments of the present invention are described below.

In one embodiment, a controller for interacting with a video game is provided. The controller includes a first portion including a first handle, a first medial connector defined along a length of the first handle, and a first geometric object defined at an end of the first handle. The controller further includes a second portion including a second handle, a second medial connector defined along a length of the second handle for coupling to the first medial connector, and a second geometric object defined at an end of the second handle. The first portion or the second portion includes a connection sensor for determining whether the controller is in a connected configuration defined by joining of the first medial connector and the second medial connector, or a disconnected configuration defined by non-joining of the first medial connector and the second medial connector. And the first geometric object and the second geometric object are positioned adjacent to each other when the controller is in the connected configuration.

In one embodiment, the first portion includes a first communications interface, and the second portion includes a second communications interface that links to the first communications interface when the controller is in a connected configuration to define a communications pathway between the first portion and the second portion.

In one embodiment, the first geometric object includes a first illumination source for illuminating the first geometric object, and the second geometric object includes a second illumination source for illuminating the second geometric object.

In one embodiment, the connection sensor triggers activation of the first and second illumination sources when the controller is determined to be in a disconnected configuration.

In one embodiment, the first portion and second portion each include at least one input mechanism selected from the following: a button, a joystick, a directional pad, a trigger, a touchpad, an accelerometer, a gyroscope, a magnetometer.

In one embodiment, the connection sensor triggers a change in an assignment of the input mechanism of the first portion or the second portion when a change between the connected configuration and the disconnected configuration is detected.

In another embodiment of the invention, a method for interfacing with an interactive video game is provided. The method initiates with establishing communication between a console and a controller, the controller defined by a first portion and a second portion. A change is detected in a configuration of the controller, the change in configuration defined by a change from a coupled configuration, wherein the first portion and second portion are coupled together, to a decoupled configuration, wherein the first portion and second portion are decoupled from each other. In response to the detected change in configuration, activating independent tracking of a location of the first portion and a location of the second portion.

In one embodiment, the tracking of the position of the first portion is defined by optical recognition of a first reference marker of the first portion, and the tracking of the position of the second portion is defined by optical recognition of a second reference marker of the second portion.

In one embodiment, the first portion and second portion each include at least one input mechanism for effecting a first function of the video game, the input mechanism selected from the following: a button, a joystick, a directional pad, a trigger, a touchpad, an accelerometer, a gyroscope, a magnetometer. And the detection of the change in configuration triggers a change in an input configuration of the input mechanism of the first portion or the second portion, such that the input mechanism effects a second function of the video game.

In one embodiment, the detection of the change in configuration triggers a change in a method of determining a roll value, a yaw value, or a pitch value of the controller.

In one embodiment, the change in the method of determining the roll value, yaw value, or pitch value of the controller is defined by switching from a method based on an internal accelerometer, gyroscope, or magnetometer of the controller, to a method based on the independent tracking of the location of the first portion and the location of the second portion.

In one embodiment, the location of the first portion and the location of the second portion define a vector quantity, the vector quantity being applied to determine a function of the video game.

In one embodiment, the method further includes detecting a second change in the configuration of the controller, the second change in configuration defined by a change from the decoupled configuration to the coupled configuration. In response to the detected second change in configuration, independent tracking of the location of the first portion and the location of the second portion is deactivated.

In one embodiment, detecting the change in configuration triggers a change in an assignment of an input mechanism of the first portion or the second portion, the input mechanism selected from the group consisting of a button, a joystick, a directional pad, a trigger, a touchpad, an accelerometer, a gyroscope, a magnetometer.

In another embodiment of the invention, a system for providing interactivity with a video game is provided. The system includes a console for rendering the video game on a display, and a controller for interfacing with the video game, the controller defined by a first portion and a second portion, the first portion and the second portion being configured to be detachably coupled to each other. The video game defines a first input mapping for the controller when the controller is in a coupled configuration, such that the first portion and second portion are coupled to each other, and a second input mapping for the controller when the controller is in a decoupled configuration, such that the first portion and second portion are decoupled from each other.

In one embodiment, the second input mapping maps a tracked location of the first portion or the second portion to an input parameter of the video game.

In one embodiment, the tracked location of the first portion or the second portion is defined by a tracked location of a visual reference marker of the first portion or the second portion.

In one embodiment, the first portion and second portion each include at least one input mechanism selected from the following: a button, a joystick, a directional pad, a trigger, a touchpad, an accelerometer, a gyroscope, a magnetometer. And the first input mapping maps the input mechanism to a first input parameter of the video game, and the second input mapping maps the input mechanism to a second input parameter of the video game.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 14 illustrates a system for interacting with a video game, in accordance with an embodiment of the invention.

DETAILED DESCRIPTION

The following embodiments describe methods and apparatus for interfacing with an interactive program.

It will be obvious, however, to one skilled in the art, that the present invention may be practiced without some or all of these specific details. In other instances, well known process operations have not been described in detail in order not to unnecessarily obscure the present invention.

Figure 1A:
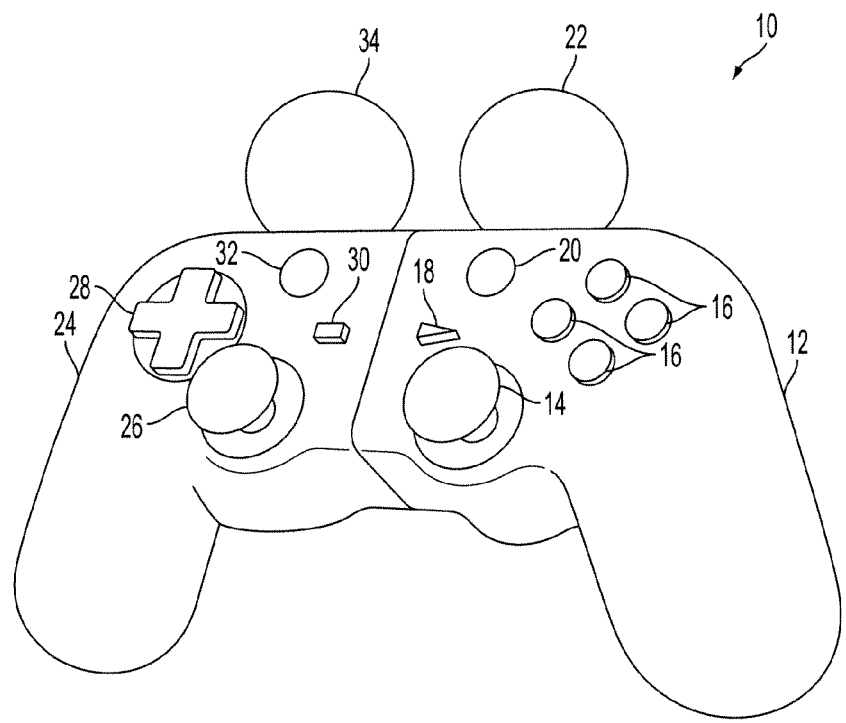
FIG. 1A illustrates a controller for interfacing with an interactive program, in accordance with an embodiment of the invention.

FIG. 1A illustrates a controller 10 for interfacing with an interactive program, in accordance with an embodiment of the invention. The controller 10 includes a first portion 12 and a second portion 24 that can be connected and disconnected from each other. The first portion 12 includes input features such as a joystick 14 and various buttons 16. The joystick 14 and buttons 16 are generally utilized to provide input to the interactive program during the user's interaction with the interactive program. The first portion 12 also includes a start button 18 and a system button 20, which can be configured to perform various functions. For example, the system button 20 can be configured to turn on or off a console system, or initiate pairing of the first portion 12 with the second portion 24. The portion 12 also includes a reference object 22 that can be utilized as a visual reference for tracking purposes. In some embodiments, the reference object 22 can be a geometric object such as a sphere or geodesic structure or portion thereof. In one embodiment, the reference object 22 is tracked by capturing video of the reference object 22 and analyzing the captured video. Methods and systems for tracking a reference object of a controller are described in U.S. patent application Ser. No. 12/259,181, entitled "DETERMINING LOCATION AND MOVEMENT OF BALL-ATTACHED CONTROLLER," filed Oct. 27, 2008, by inventors Anton Mikhailov and Richard Marks, the disclosure of which is herein incorporated by reference in its entirety.

The second portion 24 likewise includes various input features, such as joystick 26 and directional pad (d-pad) 28, which are utilized to provide input during interactivity with the interactive application. The second portion 24 also includes a select button 30 and a system button 32. As with the first portion 12, the system button 32 can be configured to perform various functions such as powering on or off a console or for pairing purposes. The second portion 24 also includes a reference object 34 that can be illuminated and visually tracked to enable tracking of the second portion 24.

Figure 1B:
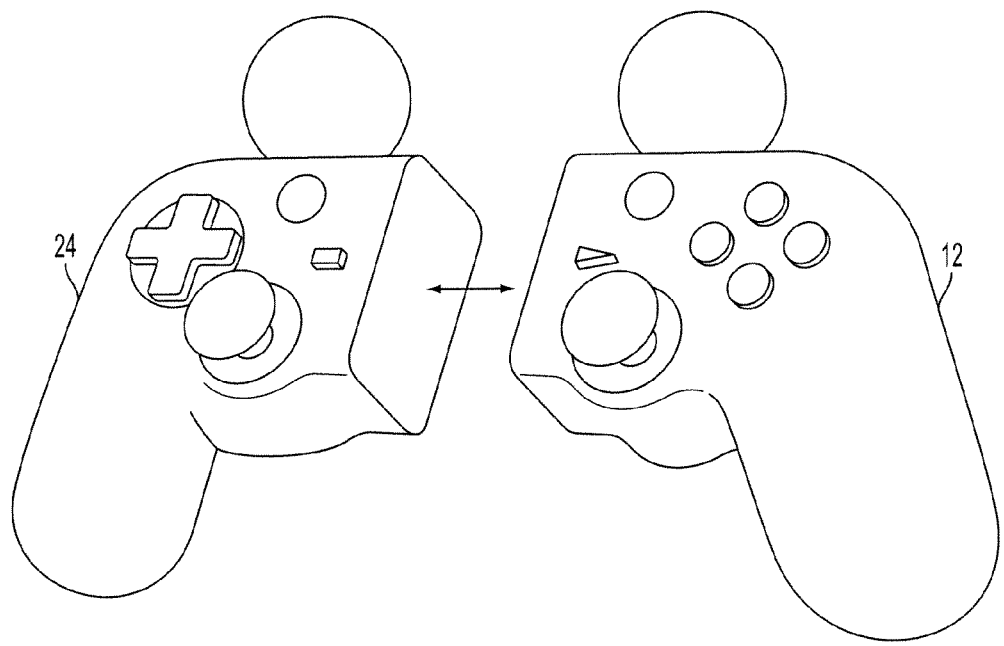
FIG. 1B shows the controller of FIG. 1A in a disconnected configuration.

FIG. 1A shows the first portion 12 and the second portion 24 in a connected configuration. However the first portion 12 and the second portion 24 can be disconnected from each other as shown at FIG. 1B. In this manner, the first portion 12 in the second portion 24 can be maneuvered independently of one another. In some embodiments, separation of the first portion 12 and the second portion 24 from each other can trigger initiation of tracking of the reference objects 22 and 34 so that the locations of the first portion 12 and the second portion 24 are individually tracked.

Figure 2A:
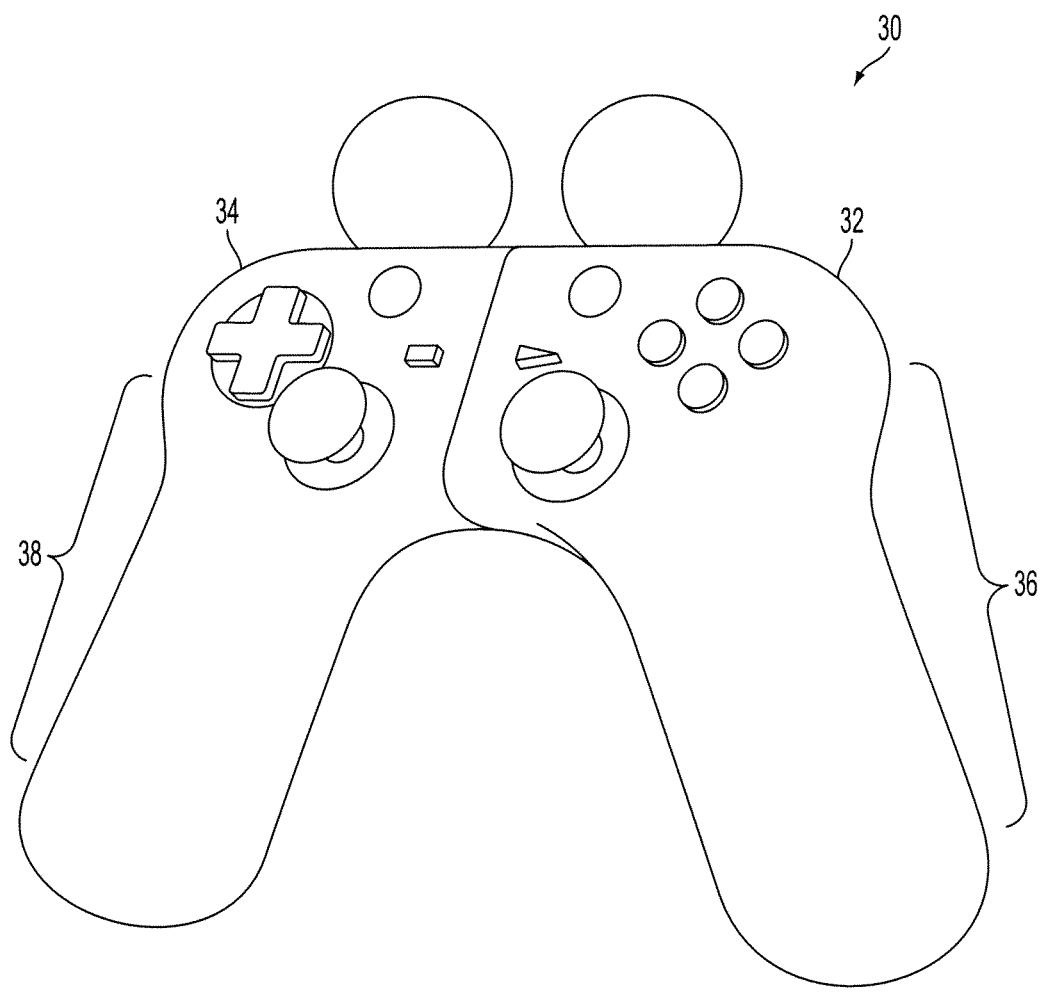
FIG. 2A illustrates a top view of a controller for interfacing with an interactive application, in accordance with an embodiment of the invention.

FIG. 2A illustrates a top view of a controller for interfacing with an interactive application, in accordance with an embodiment of the invention. As shown, a controller 30 includes both a first portion 32 and a second portion 34 which can be connected to each other or disconnected from each other. When the first portion 32 and the second portion 34 are connected to each other, the controller 30 can function in much the same manner as a conventional gaming controller. One example of a conventional gaming controller is the Dualshock® 3 wireless controller manufactured by Sony Computer Entertainment, Inc.

The first portion 32 and the second portion 34 can also be disconnected from each other and operated independently of each other. When the first portion 32 in the second portion 34 are separated from each other, they may function as two independent motion controllers. One example of a motion controller is the Playstation Move® motion controller manufactured by Sony Computer Entertainment, Inc. To facilitate a user's secure grip of the first portion 32 and the second portion 34 while operating them as motion controllers, each of the first portion 32 and the second portion 34 may be contoured and respective handle regions 36 and 38. The handle regions 36 and 38 may also utilize other mechanisms for facilitating secure gripping, such as texturing the surface of the handle regions or utilizing compliant materials that promote suitable friction when gripped by a user's hand.

Figure 2B:
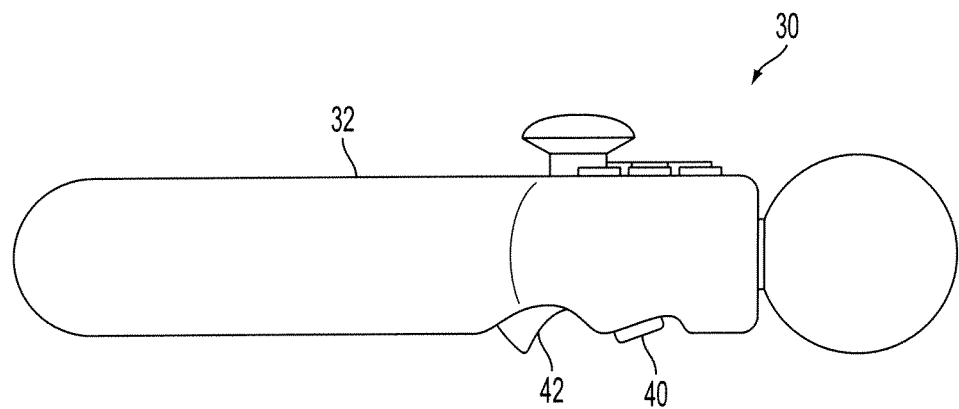
FIG. 2B illustrates a side view of the controller of FIG. 2A.

FIG. 2B illustrates a side view of the controller 30. As shown, the first portion 32 can include triggers 40 and 42. The triggers 40 and 42 provide additional input mechanisms for interfacing with the interactive application. Though not shown, the second portion 34 may also include triggers for providing input to the interactive application.

Figure 3:
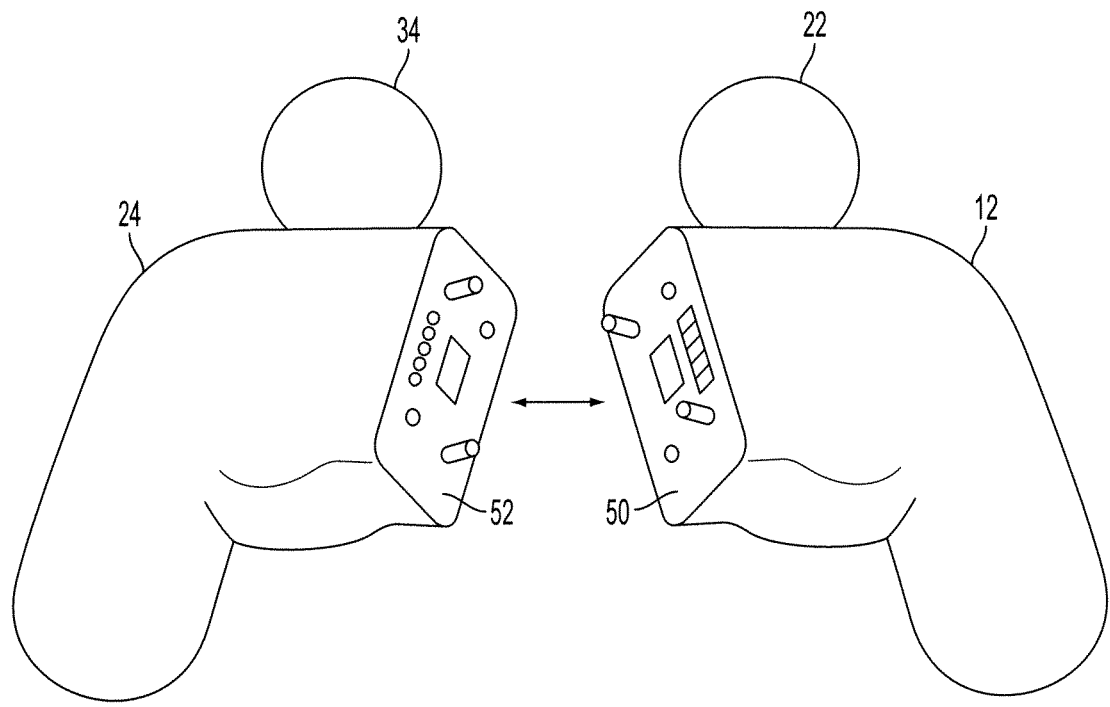
FIG. 3 illustrates a first portion and a second portion of a controller in a decoupled configuration, in accordance with an embodiment of the invention.

FIG. 3 illustrates the first portion 12 and the second portion 20 of the controller 10 in a decoupled configuration. As shown, the first portion 12 includes an interface 50 that mates with a corresponding interface 52 of the second portion 24. In various embodiments of the invention, the interface 50 and interface 52 can include any of various types of medial connector mechanisms which enable coupling and decoupling of the first portion and the second portion 24. The interfaces 50 and 52 may also include various types of electronic connection mechanisms for facilitating electronic communication between the first portion 12 and the second portion 24 when they are coupled together.

Figure 4:
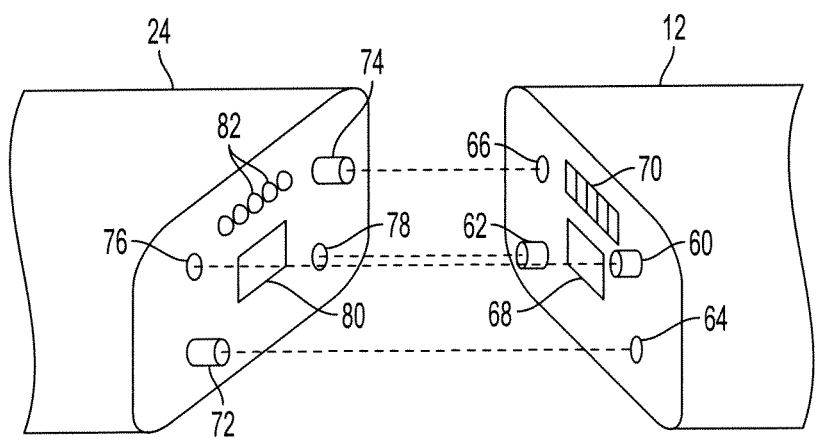
FIG. 4 illustrates interface mechanisms for coupling the first portion and the second portion of a controller, in accordance with one embodiment of the invention.

FIG. 4 illustrates various interface mechanisms for coupling the first portion 12 and the second portion 24, in accordance with one embodiment of the invention. The first portion 12 includes alignment pins 60 and 62 that interface with alignment rules 76 and 78, respectively, of the second portion 24. Similarly, the second portion 24 includes alignment pins 72 and 74 that interface with corresponding alignment holes 64 and 66, effectively, of the first portion 12. The aforementioned alignment pins and alignment holes facilitate proper alignment of the first portion 12 and the second portion 24 when they are coupled together. In one embodiment, the first portion 12 and the second portion 24 include corresponding magnets 68 and 80, respectively, for securing the first portion 12 and the second portion 24 to each other.

Additionally, the first portion 12 and the second portion 24 may include corresponding sets of electrical contacts 70 and 82, respectively. When the first portion 12 and the second portion 24 are connected to each other, the electrical contacts 70 and 82 provide a communications link between the two portions.

Figure 5A:
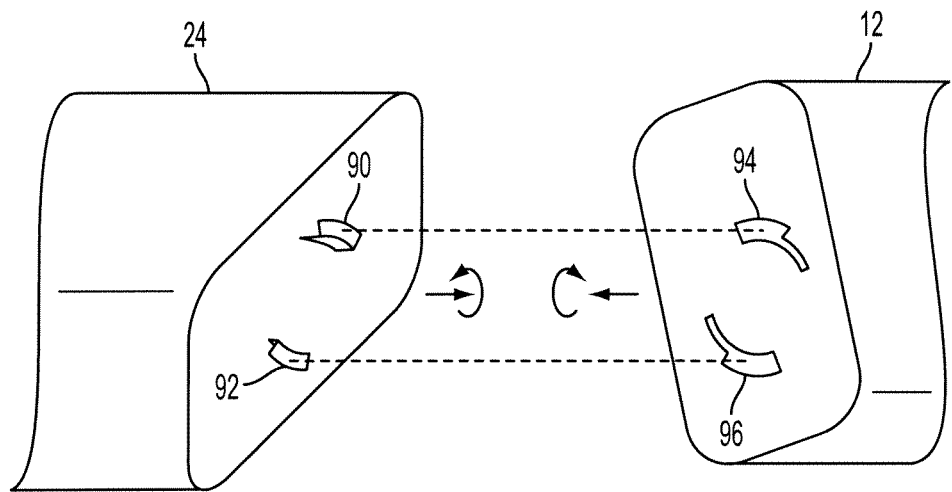
FIGS. 5A, 5B, and 5C illustrate an interface mechanism for enabling coupling and decoupling of the first portion and the second portion of a controller, in accordance with an embodiment of the invention.
Figure 5B:
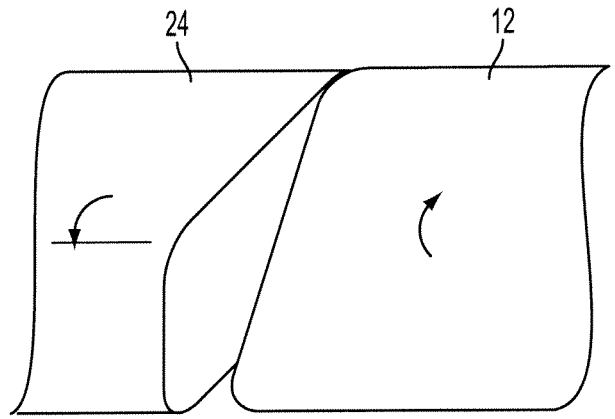
Figure 5C:
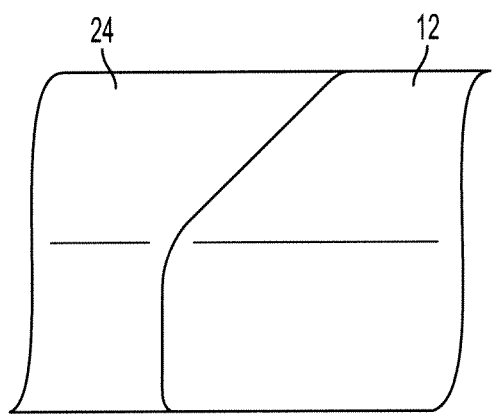

FIG. 5A illustrates an interface mechanism for enabling coupling and decoupling of the first portion 12 and the second portion 24, in accordance with another embodiment of the invention. As shown, a turn-and-lock mechanism is provided for connecting the first portion 12 and the second portion 24. The turn-and-lock mechanism includes flanges 90 and 92 of the second portion 24 which are inserted into receptacles 94 and 96, respectively, of the first portion 12. To connect the first portion 12 to the second portion 24, the flanges 90 and 92 are aligned with and inserted into receiving portions of the receptacles 94 and 96, as shown by FIG. 5B. Then the first portion 12 and the second portion 24 are rotated in opposite directions so that the flanges 90 and 92 are moved into locking portions of the receptacles 94 and 96, thereby securing the flanges and connecting the first portion 12 and the second portion 24 as shown at FIG. 5C.

Figure 6:
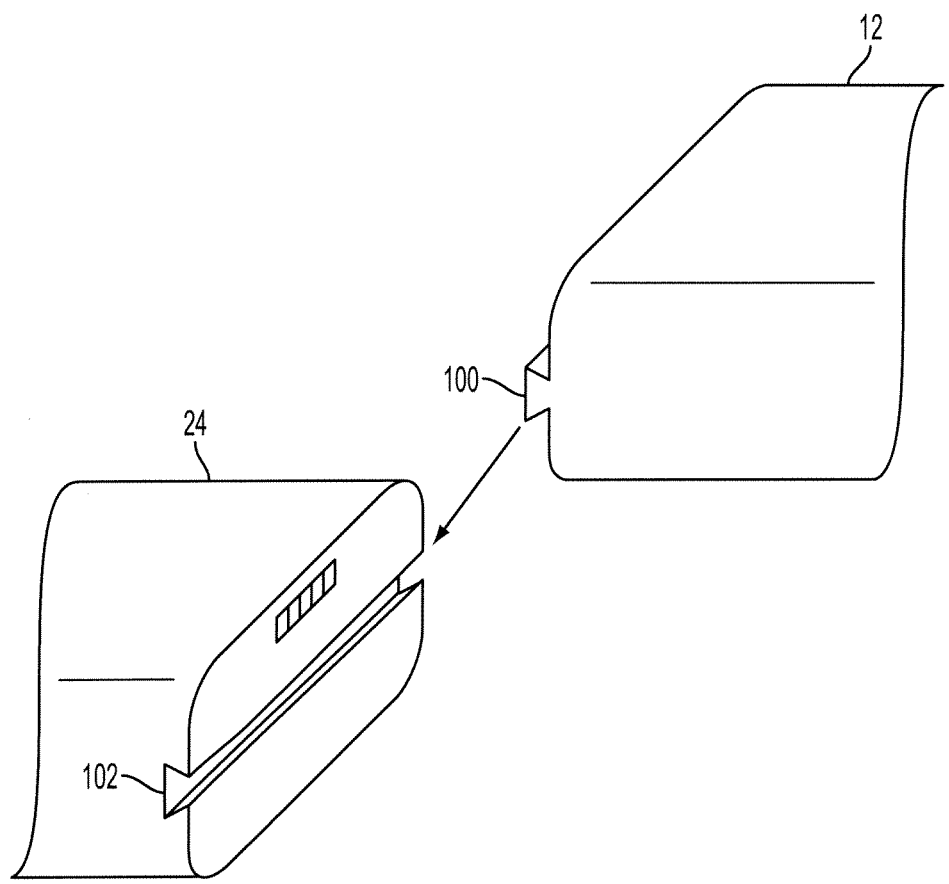
FIG. 6 illustrates a sliding mechanism for connecting the first portion and the second portion of a controller, in accordance with an embodiment of the invention.

FIG. 6 illustrates a sliding mechanism for connecting the first portion 12 and the second portion 24, in accordance with an embodiment of the invention. The first portion 12 includes a track 100 and the second portion 24 includes a corresponding groove 102. To connect the first portion 12 to the second portion 24, a user slides the track 100 into the groove 102.

Figure 7:
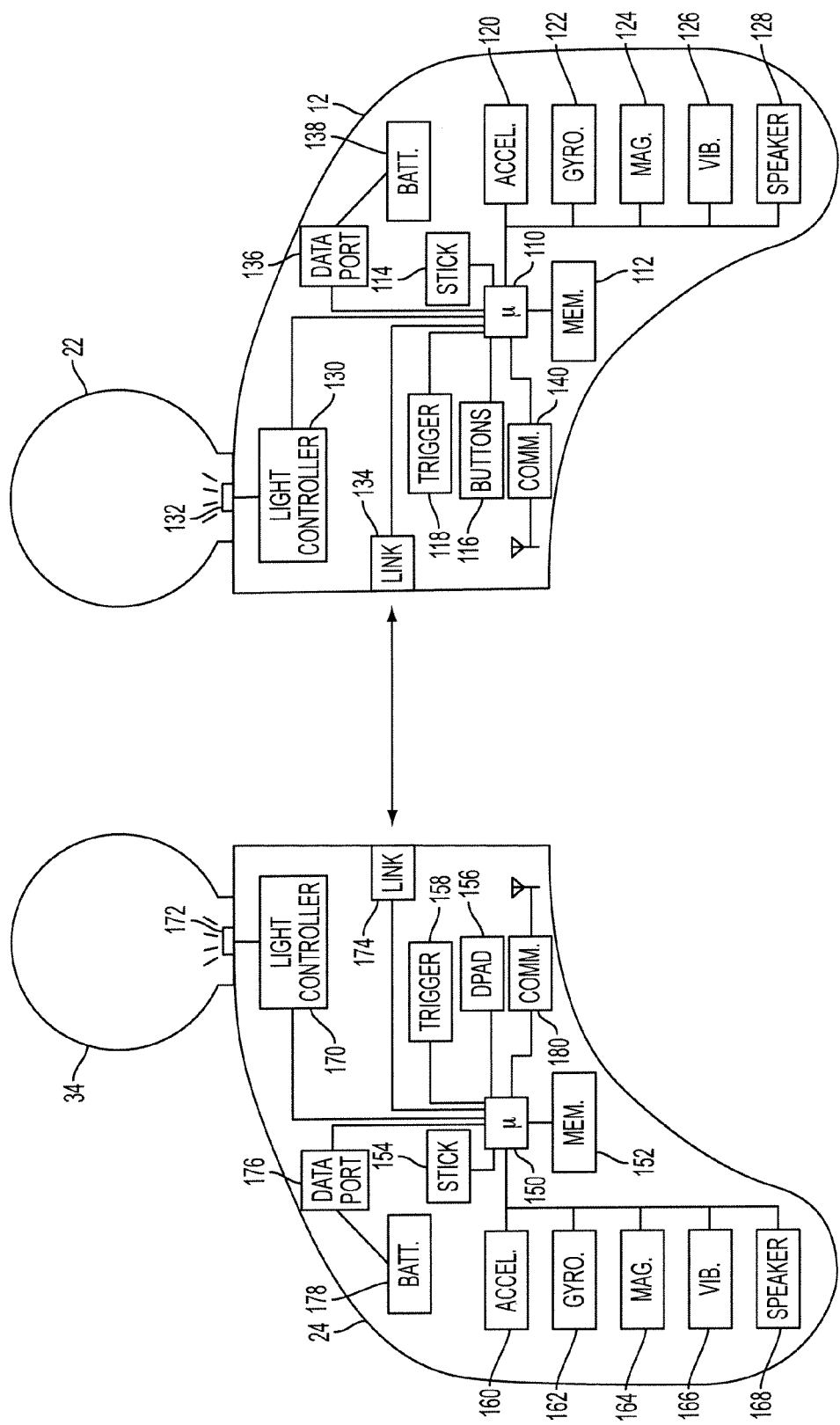
FIG. 7 is a schematic diagram showing components of a hybrid separable motion controller, in accordance with an embodiment of the invention.

FIG. 7 is a schematic diagram showing components of the controller 10, in accordance with an embodiment of the invention. The first portion 12 includes a processor 110 for executing program instructions, and a memory 112 for storing data. The first portion 12 further includes a joystick 114, buttons 116, and one or more triggers 118 for providing input to an interactive application. The first portion 12 may also include various kinds of motion sensitive hardware, such as one or more accelerometers 120, gyroscopes 122, and magnetometer 124. Additionally, a vibration module 126 can provide feedback by vibrating the first portion 12. And a speaker 128 can be used to play sounds to provide additional feedback.

The first portion 12 includes a light controller 130 for controlling the operation of a light source 132. The light source 132 is used to illuminate the reference object 22, and may be activated during tracking of the reference object 22. In some embodiments, the light source 132 can include multiple LEDs to enable the illumination of the reference marker 22 with various colors. The first portion 12 also includes a communications link 134 which enables communication between the first portion 12 and the second portion 24 when they are connected together. A data port 136 is provided for connecting the first portion 12 to a console or computer. Additionally, when the data port 136 is connected to a power source it can facilitate charging of a battery 138 which powers the first portion 12. A wireless communications module 140 facilitates wireless communication between the first portion 12 and a console or computer.

The second portion 24 includes various components analogous to those of the first portion 12. As shown, the second portion 24 includes a processor 150 and a memory 152. A joystick 144, a directional pad 146, and one or more triggers 158 are provided for enabling a user to provide input to an interactive application. Also, the second portion 24 includes one or more accelerometers 160, gyroscopes 162, and magnetometer 164. A vibration module 166 and speaker 168 provide mechanisms for supplying feedback to the user. The light controller 170, controls the operation of light source 172 which eliminates the reference object 34. A communications link 174 connects to the corresponding communications link 134 of the first portion 12 to enable communication between the second portion 24 and the first portion 12. The second portion 24 also includes a data port 176 which can connect to the console or computer, and a battery 178 for powering the second portion 24. A wireless communications module 180 facilitates wireless communication between the second portion 24 and a console or computer.

Figure 8A:
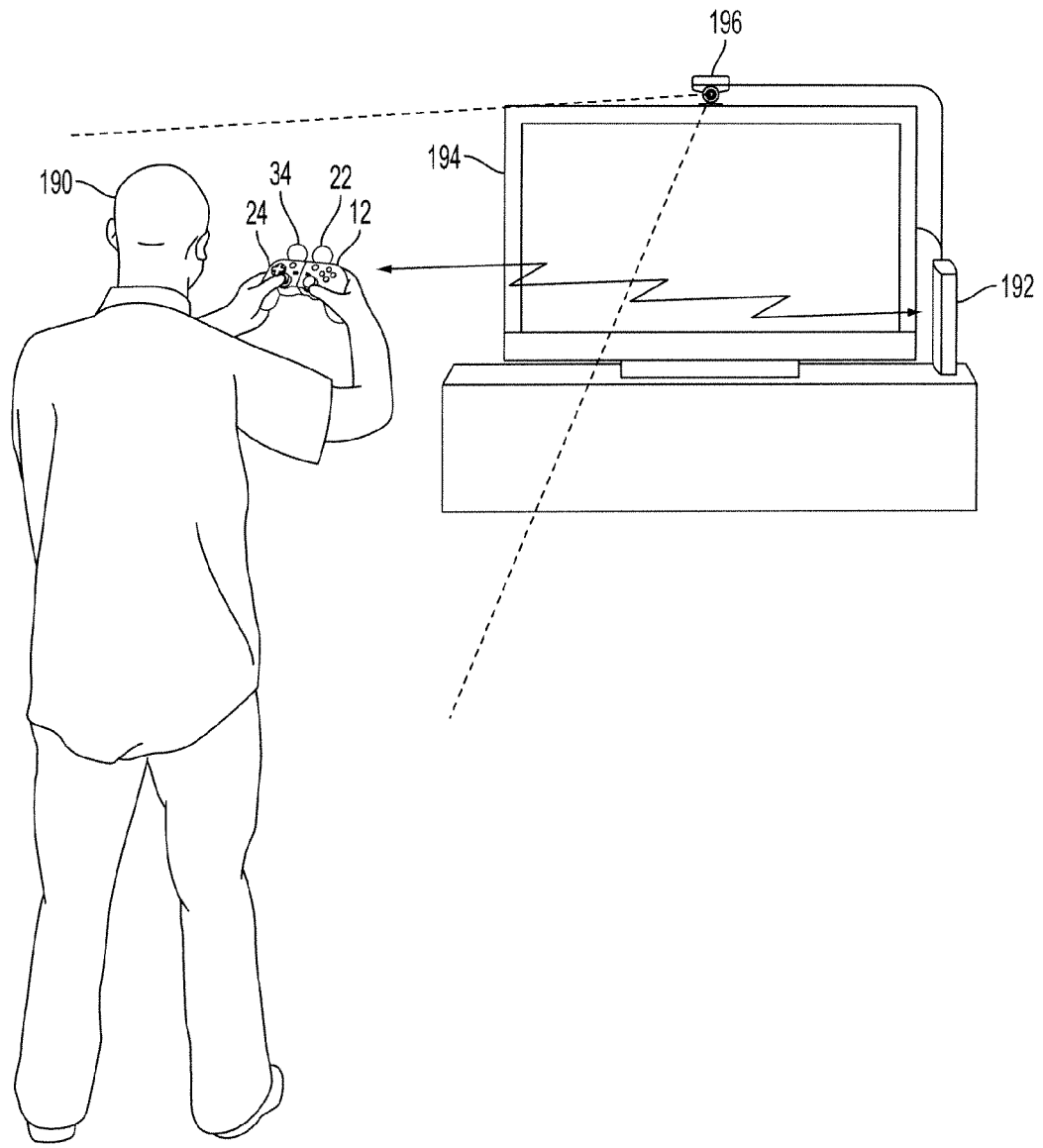
FIGS. 8A and 8B illustrate a user operating a separable motion controller to interact with an interactive application, in accordance with an embodiment of the invention.
Figure 8B:
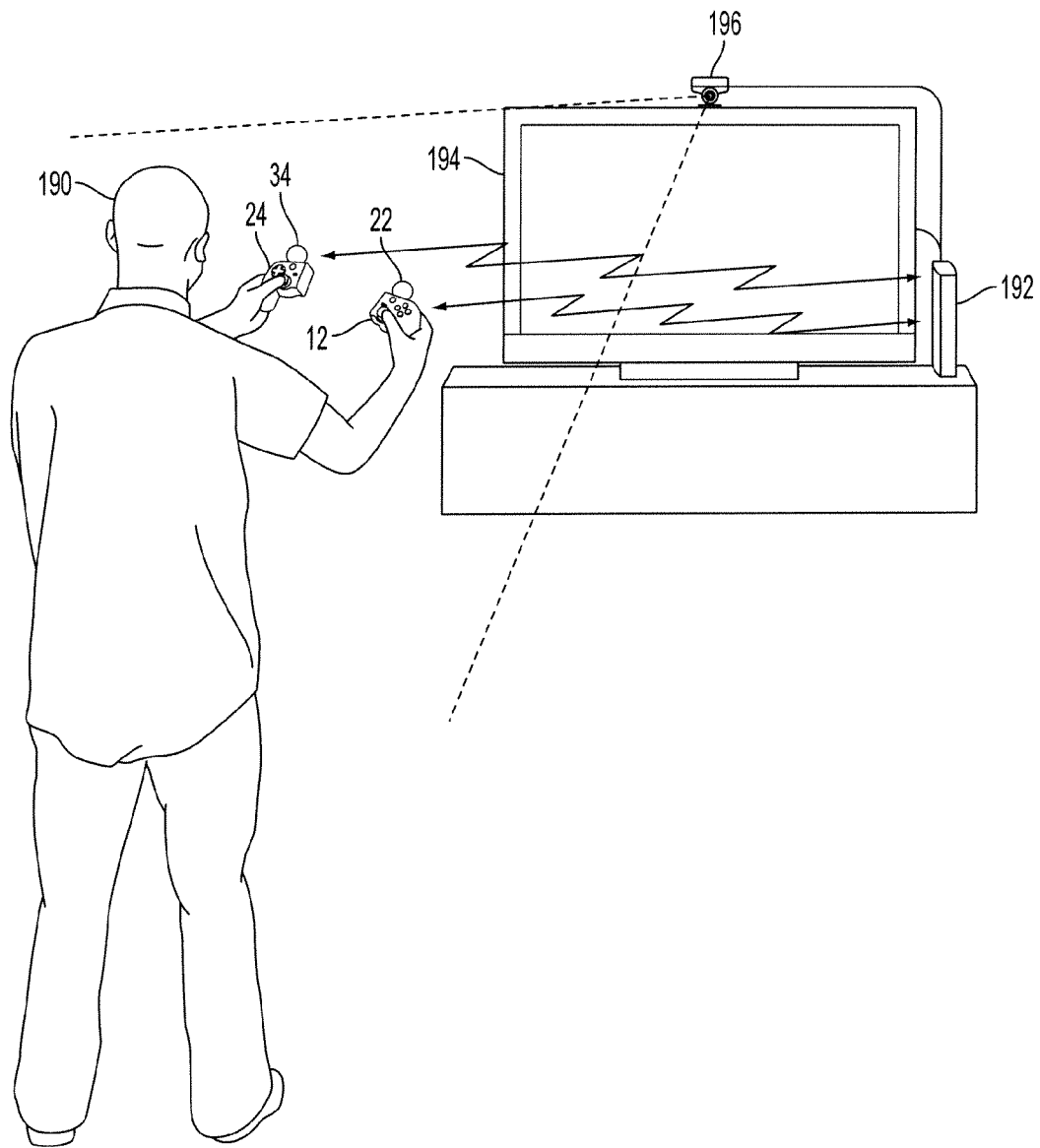

FIGS. 8A and 8B illustrate a user 190 operating a controller 10 to interact with an interactive application, in accordance with an embodiment of the invention. A console 192 renders the interactive application on a display 194, and communicates with the controller 10. In one embodiment, the console 192 is a gaming console such as the Playstation® 3 gaming console manufactured by Sony Computer Entertainment, Inc. In other embodiments, the console 192 may be any computer or device capable of rendering an interactive application on the display 194. The console device 192 also receives input from a camera 196 that captures image frames from the interactive environment in which the user 190 is situated.

As shown at FIG. 8A, the controller 10 is operated in a connected configuration, such that the first portion 12 and second portion 24 (two controller halves) which compose the controller 10 are joined together. In this configuration, the user 190 is able to operate the controller in much the same manner as a conventional gaming controller. Each of the first portion 12 and second portion 24 of the controller 10 can communicate input wirelessly to the console 192. During operation of the controller 10 in the connected configuration, the movement of each of the first portion 12 and second portion 24 can be tracked by tracking the movement of their respective reference objects 22 and 34. In one embodiment, the camera 196 captures an image stream which is analyzed to determine the position and movement of the reference objects 22 and 34, and by extension the position and movement of the controller 10. However, as the controller halves are joined together, the reference objects 22 and 34 cannot be moved independently of one another, and their relationship to one another is fixed.

At FIG. 8B, the user 190 has separated the first portion 12 from the second portion 24 so as to operate the controller 10 in a disconnected configuration. The movement of the reference objects 22 and 34 can be independently tracked, enabling the user 190 to provide additional types of input through independent manipulation of the first portion 12 and the second portion 24. Each of the first portion 12 and second portion 24 communicates wirelessly with the console 192, transmitting input data such as button or trigger presses, joystick movements, d-pad presses, and motion sensor data from accelerometers, gyroscopes, and magnetometers.

Figure 9A:
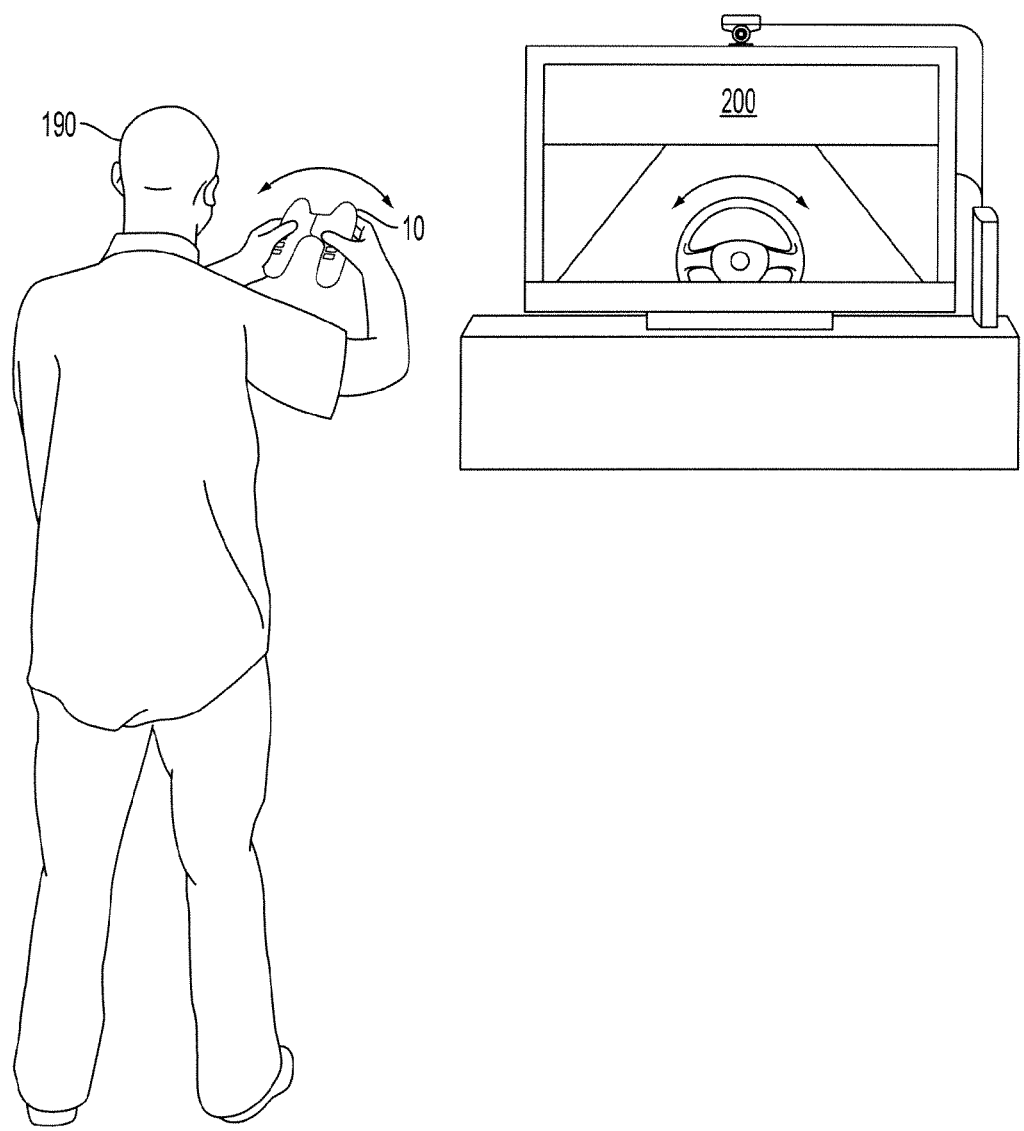
FIGS. 9A and 9B illustrate a change in the configuration of a controller operated in conjunction with different stages of a video game, in accordance with an embodiment of the invention.
Figure 9B:
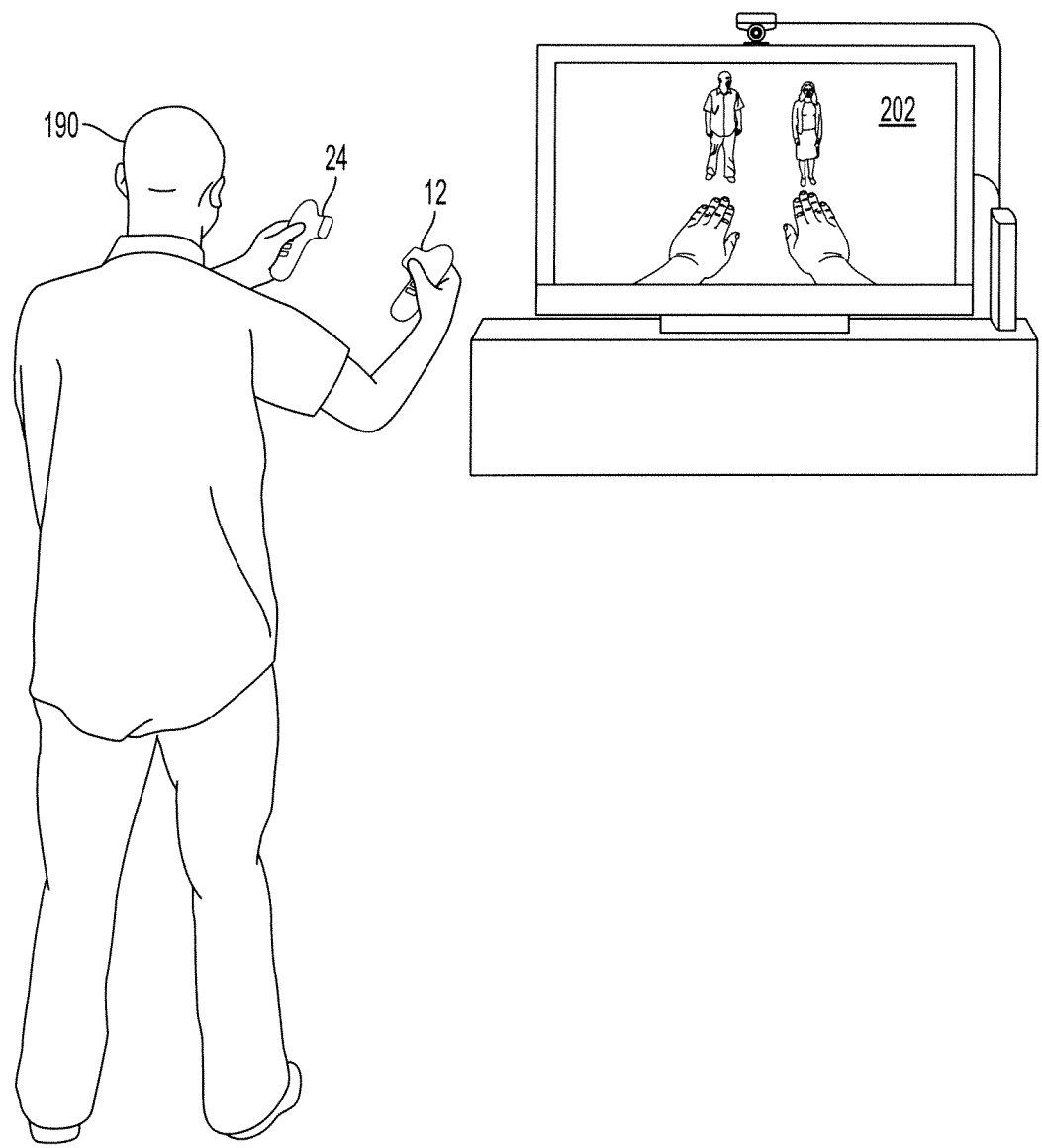

FIGS. 9A and 9B illustrate a change in the configuration of a controller operated in conjunction with different stages of a video game, in accordance with an embodiment of the invention. As shown at FIG. 9A, a user 190 operates the controller 10 in a connected configuration during gameplay of a scene 200 of the video game. In one embodiment, the user 190 maneuvers the controller 10 in a similar fashion as a steering wheel, so as to control the steering of a vehicle in the video game scene 200. The movement of the controller 10 can be detected based on motion sensitive hardware in the controller 10 such as through accelerometers, gyroscopes, and magnetometers, or via optical tracking of reference objects on the controller. In other embodiments, the user 190 can control the steering by other mechanisms of the controller 10, such by operating a joystick or d-pad of the controller 10.

At a different stage of the video game, shown at FIG. 9B, the user 190 engages in a fistfight in a scene 202. Thus, in order to independently control the movement of the arms of the user 190's character in the scene 202, the user 190 separates the controller 10's first portion 12 and second portion 24 from each other. The user 190 is now able to freely move the first portion 12 and the second portion 24 in a wholly independent fashion. The movement of the first portion 12 and second portion 24 are independently tracked, allowing the user 190 to intuitively control the movement of each of the user's character's arms in the scene 202 of the video game.

The transition between the scene 200 and the scene 202 may be accomplished in various ways, according to various embodiments of the invention. For example, in one embodiment, after the user 190 completes the stage associated with scene 200, the video game informs the user that in preparation for the next stage, the user 190 should separate the controller 10. The video game may pause and wait until the controller 10 is detected to be in a disconnected configuration and active tracking of the first portion 12 and second portion 24 is confirmed, whereupon the video game proceeds to the next stage associated with scene 202. In other embodiments, the video game does not pause but continues to the next stage while displaying a notice informing the user 190 that the controller 10 should be separated to initiate proper control of the video game character's arms. In other embodiments, the user 190 may have the option of operating the controller 190 in either the connected or disconnected mode, so that the user 190 has freedom to decide how to control the actions in the video game based on the user's personal preference. In such an embodiment, certain actions of the video game will have two different methods of control, one for when the controller 10 is in a connected configuration, and one for when the controller 10 is in a disconnected configuration.

Figure 10A:
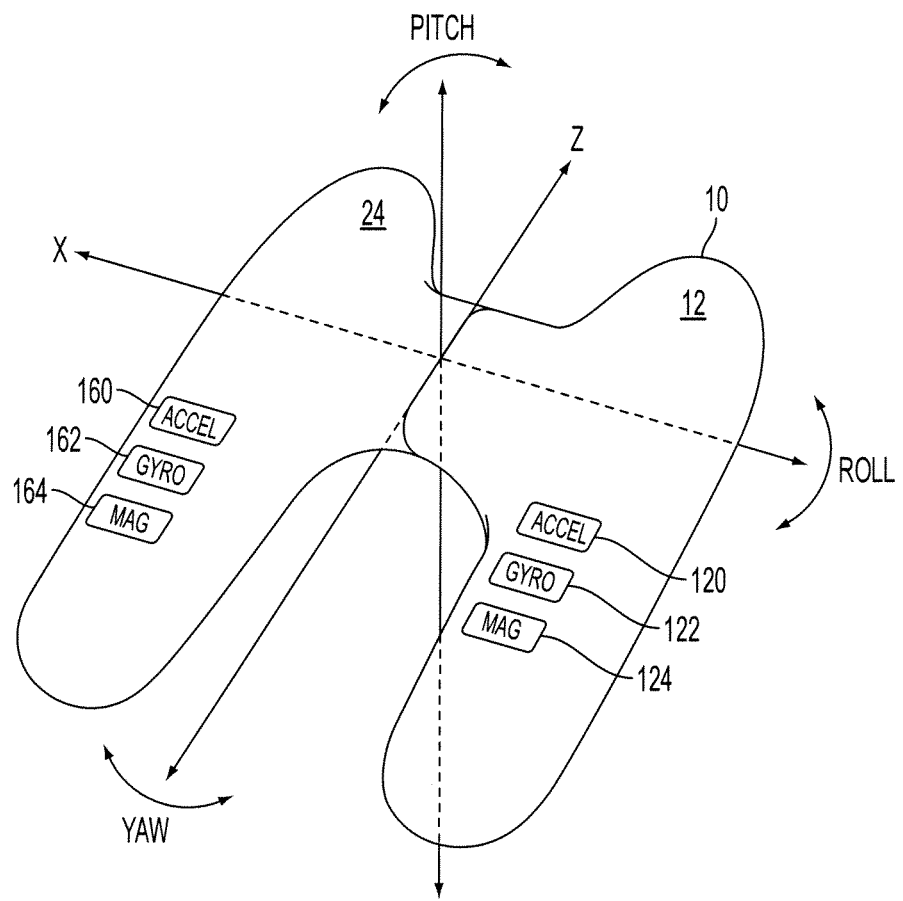
FIGS. 10A and 10B illustrates roll, pitch, and yaw of a controller in a connected configuration and a disconnected configuration, in accordance with an embodiment of the invention.

FIG. 10A illustrates roll, pitch, and yaw of the controller 10 in a connected configuration, in accordance with an embodiment of the invention. As shown, x, y, and z axes are centered at the center of the controller 10. In the illustrated embodiment, roll is the rotation of the controller about the z-axis; pitch is the rotation of the controller about the x-axis; and yaw is the rotation of the controller 10 about the y-axis. When the controller 10 is in a connected configuration, the roll, pitch, and yaw can be detected based on measurements taken by onboard accelerometers, gyroscopes, and magnetometers. As shown, the first portion 12 includes accelerometers 120, gyroscopes 122, and magnetometer 124, whereas the second portion 24 includes accelerometers 160, gyroscopes 162, and magnetometer 164.

Figure 10B:
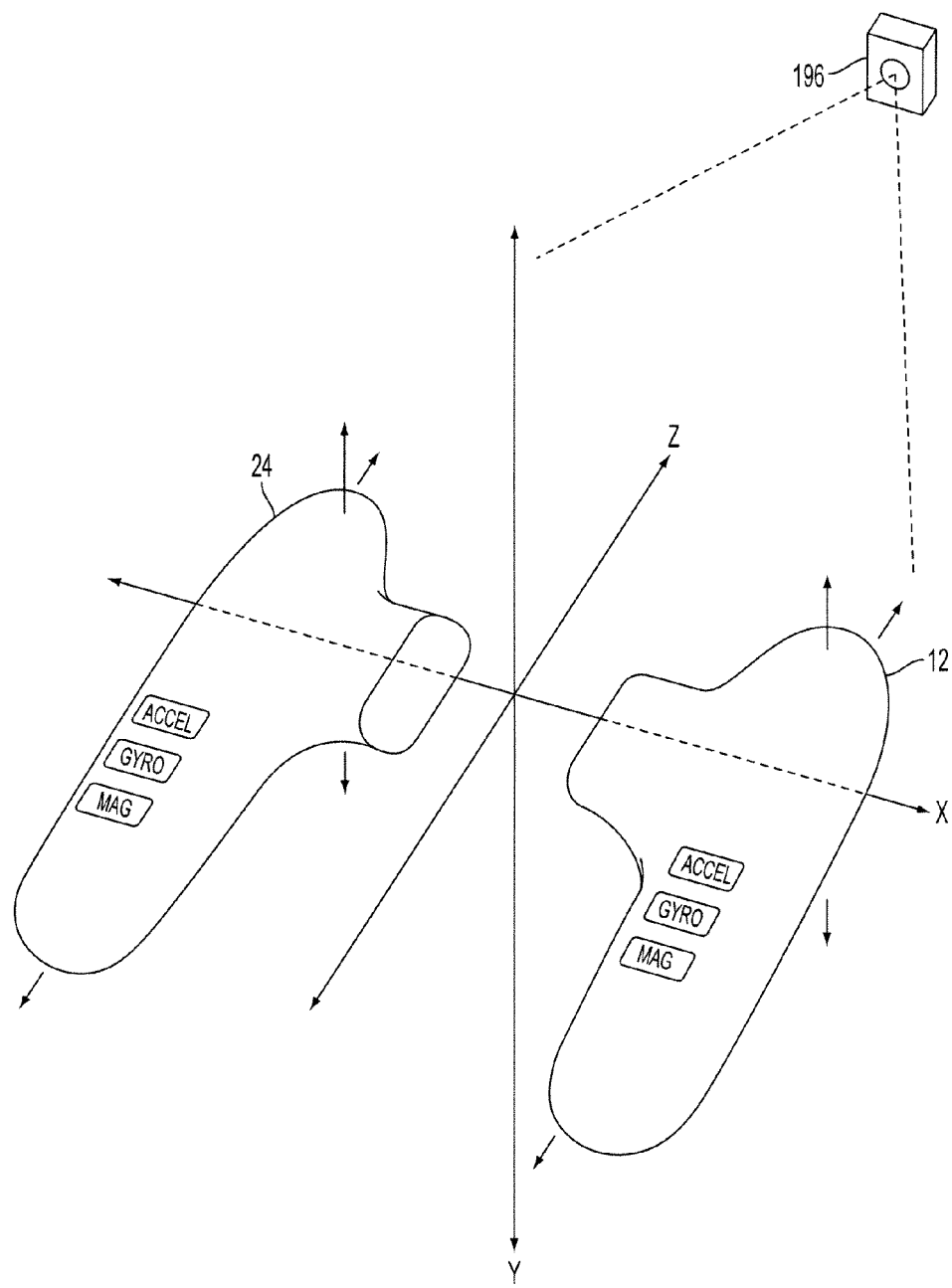

However, when the controller 10 is separated, as shown at FIG. 10B, each of the first portion 12 and the second portion 24 have individual pitch, roll, and yaw values. In some embodiments, the pitch, roll, and yaw values are determined for each of the first portion 12 and the second portion 24 based on their respective accelerometers, gyroscopes, and magnetometers. In one embodiment, the pitch, roll, and yaw values for each of the first portion 12 and second portion 24 are averaged together to provide overall values of pitch, roll, and yaw for the controller 10.

In another embodiment, the reference objects of the first portion 12 and the second portion 24 are tracked via camera 196 so as to enable tracking of the locations of the first portion 12 and second portion 24. The tracked locations of the first portion 12 and the second portion 24 are then utilized to determine equivalent pitch, roll, and yaw values for the controller 10 overall.

Figure 10C:
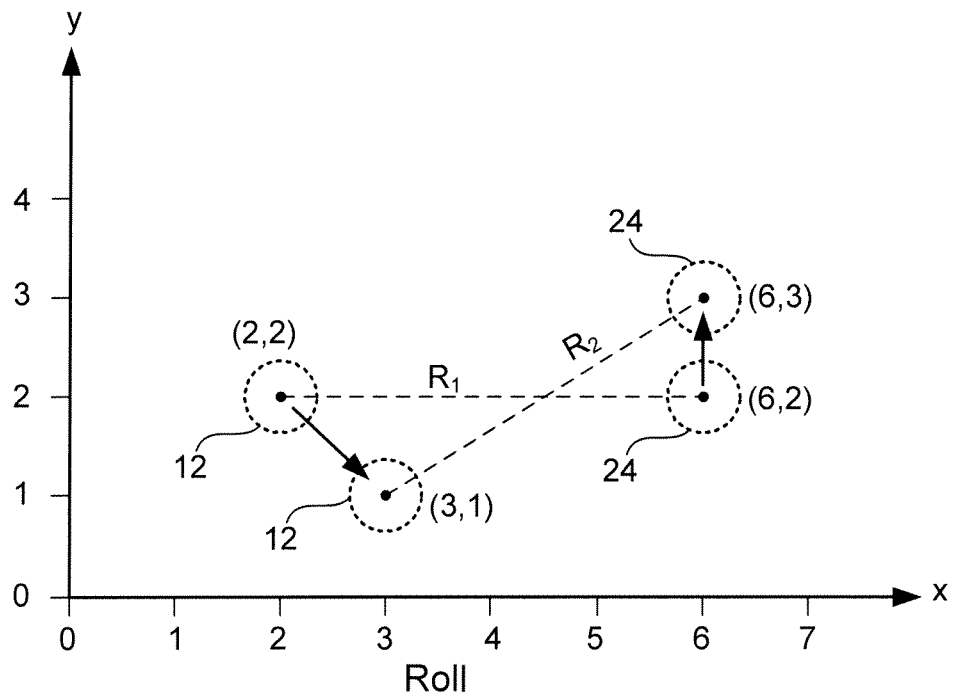
FIG. 10C illustrates a method for determining roll based on the tracked positions of the first portion and second portion of a controller, in accordance with one embodiment of the invention.

FIG. 10C illustrates a method for determining roll based on the tracked positions of the first portion 12 and second portion 24 of controller 10, in accordance with one embodiment of the invention. In the illustrated embodiment, the positions of the first portion 12 and the second portion 24 along the x and y axes are shown. The initial location of the first portion 12 is at coordinates (2, 2), and the initial location of the second portion 24 is at coordinates (6, 2). At their initial positions, the first portion 12 and second portion 24 define an x-y slope value of zero. The roll of the controller 10 can be calculated based on this slope value as zero degrees.

When the user moves the first portion 12 to x-y coordinates (3, 1) and the second portion 24 to (6, 3), then the new locations define a slope value of ⅔. This correlates to a roll value of $-\arctan(\frac{2}{3})$ or approximately −18.4 degrees. As can be seen, the slope value based on the x and y axis positions of the first portion 12 and second portion 24 can be utilized to determine an overall roll value for the controller.

Figure 10D:
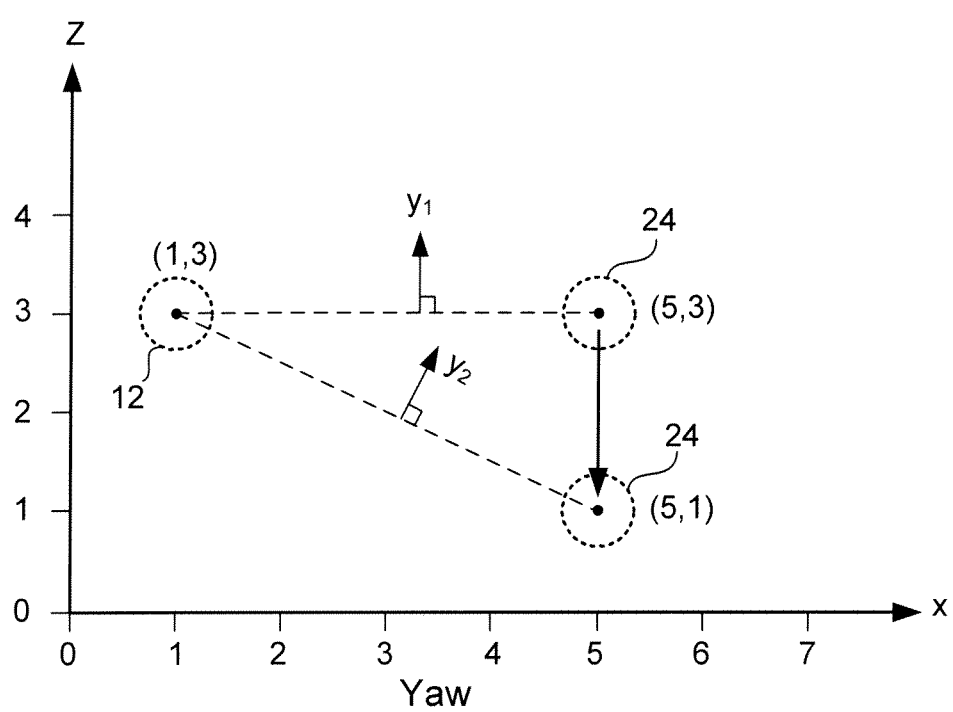
FIG. 10D illustrates a method for determining yaw based on the tracked positions of the first portion and second portion of a controller, in accordance with one embodiment of the invention.

FIG. 10D illustrates a method for determining yaw based on the tracked positions of the first portion 12 and second portion 24 of controller 10, in accordance with one embodiment of the invention. In the illustrated embodiment, the positions of the first portion 12 and the second portion 24 along the x and z axes are shown. The initial location of the first portion 12 is at coordinates (1, 3), and the initial location of the second portion 24 is at coordinates (5, 3). At their initial positions, the first portion 12 and second portion 24 define an x-z slope value of zero. The yaw of the controller 10 can be calculated based on this slope value as zero degrees.

When the user moves the second portion 24 to x-z coordinates (5, 1) while keeping the first portion 12 at its initial position of (1, 3), the new x-z slope value is $-\frac{2}{4}$. This correlates to a yaw value of $\arctan(\frac{2}{4})$ or approximately 26.6 degrees. As can be seen, the slope value based on the x and z axis positions of the first portion 12 and second portion 24 can be utilized to determine an overall yaw value for the controller 10.

Figure 10E:
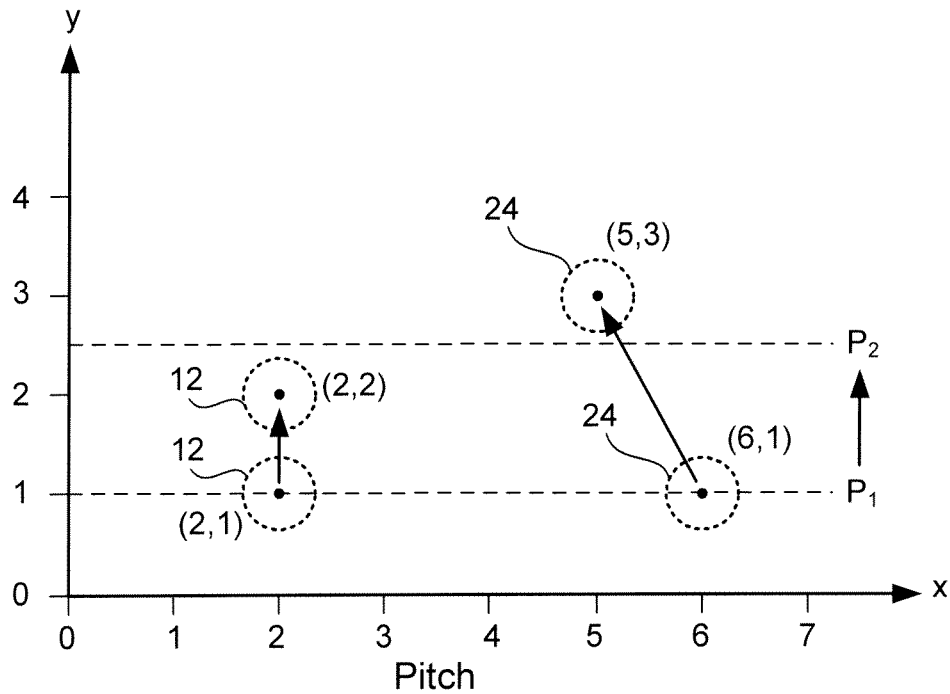
FIG. 10E illustrates a method for determining pitch based on tracked positions of the first portion and second portion, in accordance with one embodiment of the invention.

FIG. 10E illustrates a method for determining pitch based on tracked positions of the first portion 12 and second portion 24, in accordance with one embodiment of the invention. As shown, the first portion 12 has initial x-y coordinates (2, 1) and the second portion 24 has initial x-y coordinates (6, 1). In one embodiment, the overall pitch of the controller 10 is determined based on the average y coordinate values of the controller portions. For example, in one embodiment the correlation may be a pitch value of 10 degrees for every one y-coordinate unit value. Thus, if the average y coordinate value of the first and second portions of the controller 10 is zero, then the controller 10 is determined to have an overall pitch of zero. And when the average y coordinate value is 1, as is the case at the initial positions of the first portion 12 and second portion 24, then a corresponding pitch value $P_1=10$ degrees. When the first portion is moved to x-y coordinates (2, 2) and the second portion 24 to (5, 3), then the average y-coordinate value is 2.5, which has a corresponding pitch value $P_2=25$ degrees.

Figure 10F:
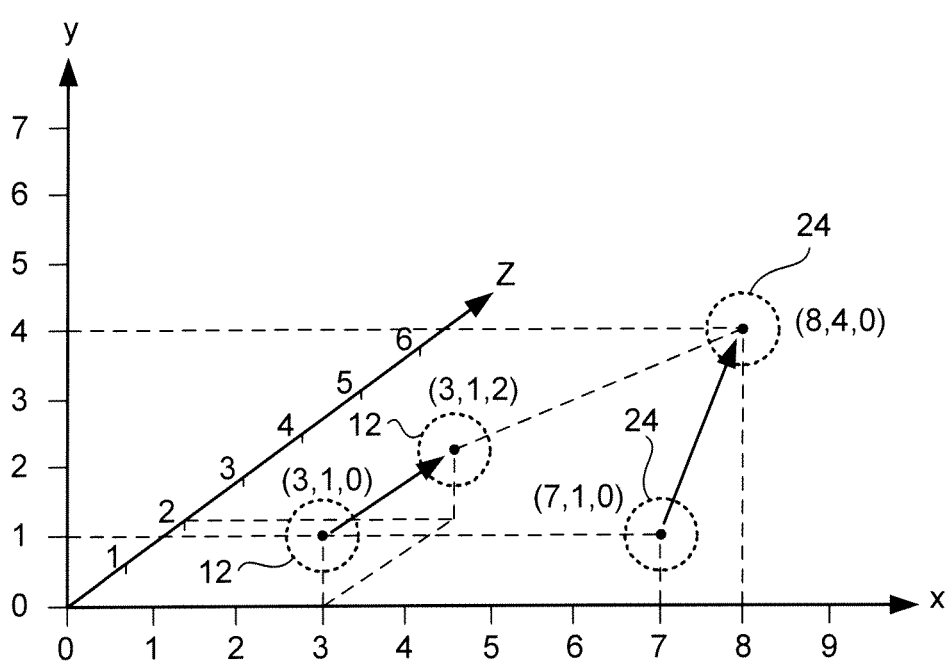
FIG. 10F illustrates independent movement of the first portion and second portion of a controller in a three-dimensional space, in accordance with an embodiment of the invention.

FIG. 10F illustrates independent movement of the first portion and second portion 12 and 24 in a three-dimensional space, in accordance with an embodiment of the invention. The three-dimensional space is defined by x, y, and z axes. The first portion 12 has an initial location defined by coordinates (3, 1, 0), and the second portion 24 has an initial location defined by coordinates (7, 1, 0). These initial locations define an initial pitch correlated to an average y-coordinate value of 1.

They also define initial roll and yaw values of zero and zero. When the first portion 12 is moved to (3, 1, 2) and the second portion 24 is moved to (8, 4, 0), then a new roll value is determined as $-\arctan(3/5)=30.1$ degrees and a new yaw value is determined as $\arctan(2/5)=21.8$ degrees.

The foregoing methods are provided by way of example only, illustrating how pitch, roll, and yaw values for the controller 10 can be determined both when the controller 10 is in a connected configuration, and when the controller 10 transitions to a disconnected configuration. When the controller 10 is operated in the connected configuration, the actual pitch, roll, and yaw of the controller 10 can be utilized based on sensor data. However, when the controller 10 transitions to the disconnected configuration, the tracked location of the controller portions can be utilized to determine equivalent pitch, roll, and yaw values. In this manner, the user is able to choose between operating the controller in a connected or disconnected configuration, and correspondingly utilizes a different operational schema to provide pitch, roll, and yaw inputs to the interactive application depending upon the user's choice. While specific embodiments have been described, it will be understood that in other embodiments, the tracked locations of the controller portions when separated may be utilized in other ways to determine pitch, roll, and yaw values equivalent to those generated when the controller is operated in the connected configuration.

Figure 11:
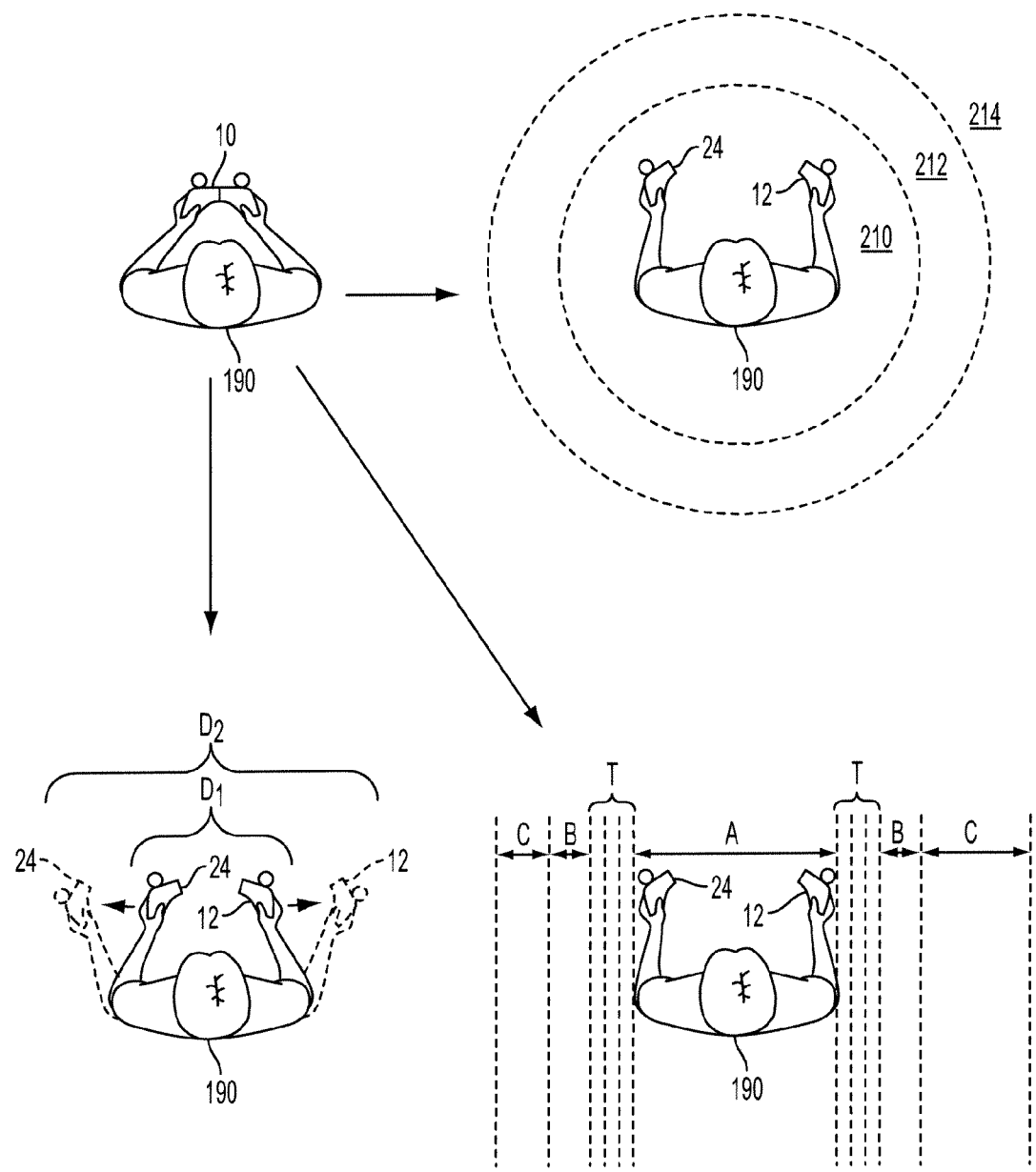
FIG. 11 illustrates several possible modes of operation that may be triggered when a user transitions a controller from a connected configuration to a disconnected configuration, in accordance with embodiments of the invention.

FIG. 11 illustrates several possible modes of operation that may be triggered when a user 190 transitions a controller 10 from a connected configuration to a disconnected configuration. For example, in one embodiment, when the controller 10 is separated such that the first portion 12 and second portion 24 are disconnected from each other, various interactive zones 210, 212, and 214 are defined. The locations of the first portion 12 and second portion 24 are independently tracked, and the input configuration of the first portion 12 or second portion 24 may change depending upon which of the interactive zones 210, 212, or 214 the portion is located within. For example, when operated within the zone 210, the first or second portions 12 or 24 control the firing of a weapon. However, when the user 190 holds the first or second portion 12 or 24 in the zone 212 and presses a trigger, then the weapon is reloaded. In other embodiments, the various zones 210, 212, or 214 can be configured to affect the functionality of the first and second portions 12 and 24 in any number of ways, such as changing the function of an input mechanism on the first or second portions, or changing the effect of the movement of the first or second portions.

In another embodiment, separation of the first and second portions 12 and 24 of the controller 10 triggers initiation of various lateral zones. When the controller transitions to the disconnected configuration, a zone A is defined for normal operation of the first and second portions 12 and 24. When the user moves a controller portion into a transition zone T, feedback is provided to the user indicating that the portion is transitioning to a different zone. For example, in one embodiment, the controller portion may be caused to vibrate when in the transition zone T, indicating to the user the transition. Then when the controller portion moves into a lateral zone B, the functionality of the controller portion is altered. In one embodiment, when the controller portion is moved into a zone C, the functionality of the controller portion is again changed. In one embodiment, movement of the controller portion into the zone C causes the controller portion to be inoperative, as the controller portion is determined to be extended too far.

In another embodiment, separation of the first and second portions 12 and 24 of the controller 10 triggers initiation of tracking of the distance between the reference objects of the controller portions 12 and 24. For example, the controller portions may be separated by a distance $D_1$ at one point in time, and separated by a distance $D_2$ at another point in time. In one embodiment, the tracked distance between the controller portions can be utilized as an input for an interactive application. For example, in one embodiment, an interactive application may require the user to maintain the first and second portions 12 and 24 within a certain distance of each other. When the controller portions 12 and 24 are moved too far apart the user may be informed through vibration feedback of the portions 12 and 24.

Figure 12A:
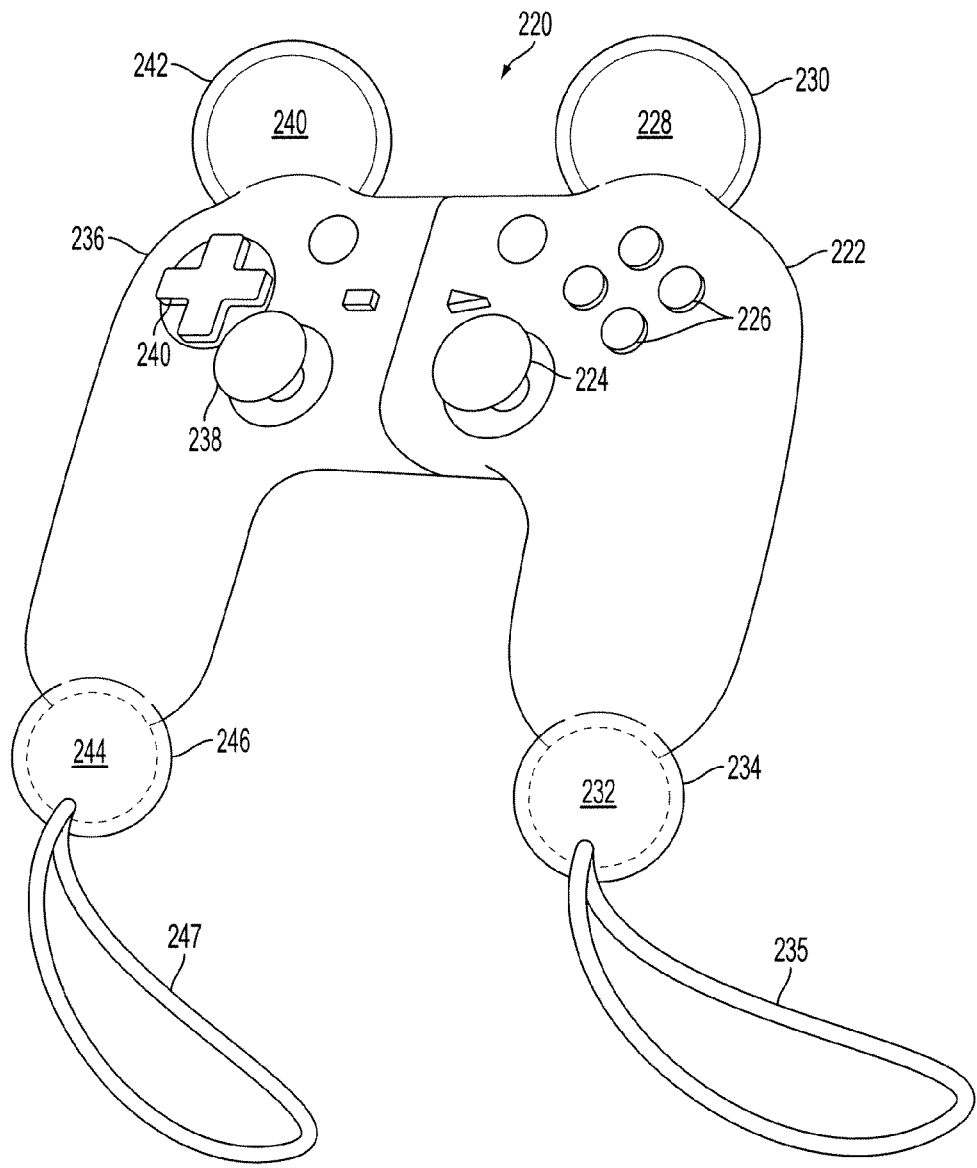
FIGS. 12A and 12B illustrate a hybrid separable controller for interfacing with an interactive application, in accordance with an embodiment of the invention.

FIG. 12A illustrates a hybrid separable controller 220 for interfacing with an interactive application, in accordance with an embodiment of the invention. The controller 220 is composed of two controller halves—a right controller 222 designed to be held in a user's right hand, and a left controller 236 designed to be held in the user's left hand. The right controller 222 includes various input devices, such as a joystick 224 and buttons 226. The right controller 222 also includes a top reference object 228 that can be tracked via optical recognition. In one embodiment, the top reference object 228 is embedded within a top section 230 of the right controller 222. The top section 230 may include a translucent or transparent material so as to enable the top reference object 228 to be externally visible. The top reference object 228 can be illuminated during tracking to enhance visual recognition as well as to enhance the user's experience as a visual effect. The right controller 222 also includes a bottom reference object 232 that can be tracked via optical recognition. In one embodiment, the bottom reference object 232 is also embedded within a bottom section 234 of the right controller 222. The bottom section 234 can include a translucent or transparent material to enable the bottom reference object 232 to be externally visible. The bottom reference object 232 can be illuminated to enhance visual tracking as well as enhance the user's experience through visual effect. Additionally, the right controller 222 includes a wrist strap 235 for securing the right controller 222 to the user's right hand wrist.

The left controller 236 includes various input devices, such as a joystick 238 and d-pad 240. The left controller 236 also includes a top reference object 240 that can be tracked via optical recognition. In one embodiment, the top reference object 240 is embedded within a top section 242 of the left controller 236. The top section 242 may include a translucent or transparent material so as to enable the top reference object 240 to be externally visible. The top reference object 240 can be illuminated during tracking to enhance visual recognition as well as to enhance the user's experience as a visual effect.

The left controller 236 also includes a bottom reference object 244 that can be tracked via optical recognition. In one embodiment, the bottom reference object 244 is also embedded within a bottom section 246 of the left controller 236. The bottom section 246 can include a translucent or transparent material to enable the bottom reference object 244 to be externally visible. The bottom reference object 244 can be illuminated to enhance visual tracking as well as enhance the user's experience through visual effect. Additionally, the left controller 236 includes a wrist strap 247 for securing the left controller 236 to the user's left hand wrist.

By including both a top and a bottom reference object in each of the right controller 222 and left controller 236, visual tracking of the right and left controllers is enhanced. For during active tracking of the right or left controller, at least one of the top or bottom reference objects is likely to be visible to an image capture device that is utilized to capture images of the reference objects for tracking purposes. Furthermore, for each of the right or left controller, the top and bottom reference objects can be simultaneously tracked to determine the alignment of the controller in three-dimensional space. In other words, for the right controller 222, when both the top reference object 228 and the bottom reference object 232 are simultaneously tracked, the three-dimensional alignment of the right controller 222 can be determined because the positions of the top reference object 228 and bottom reference object 232 are known. Similarly, the alignment of the left controller 236 can be determined based on the tracked positions of the top reference object 240 and the bottom reference object 244.

Figure 12B:
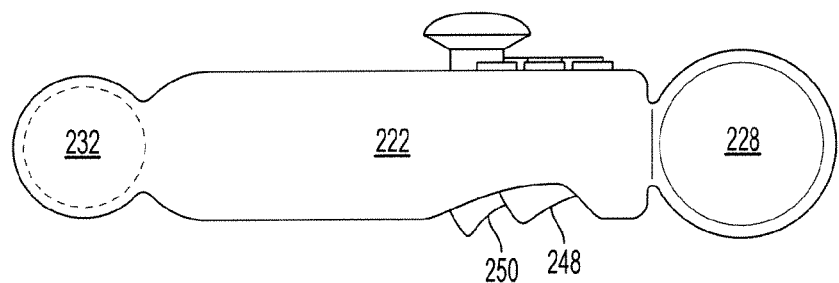

FIG. 12B illustrates a side view of the controller 220, showing the side profile of the right controller 222. As shown, the right controller 222 includes a first trigger 248 and a second trigger 250. Though not shown, the left controller 236 may also include respective first and second triggers.

Figure 13A:
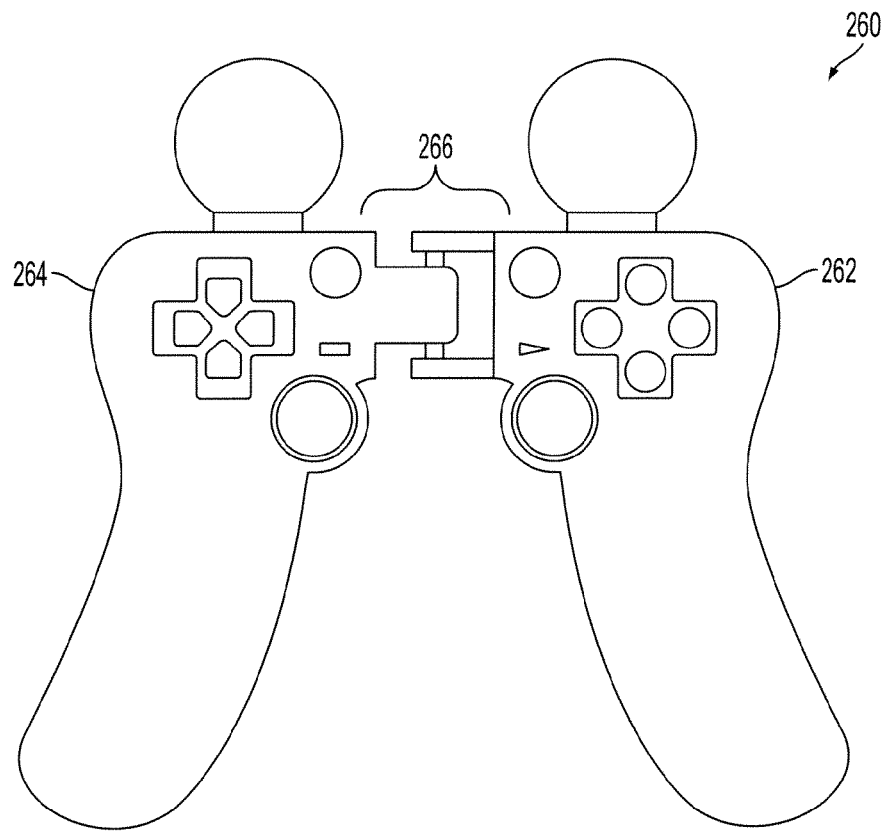
FIGS. 13A and 13B show top and front views of a controller for interfacing with an interactive application, in accordance with an embodiment of the invention.
Figure 13B:
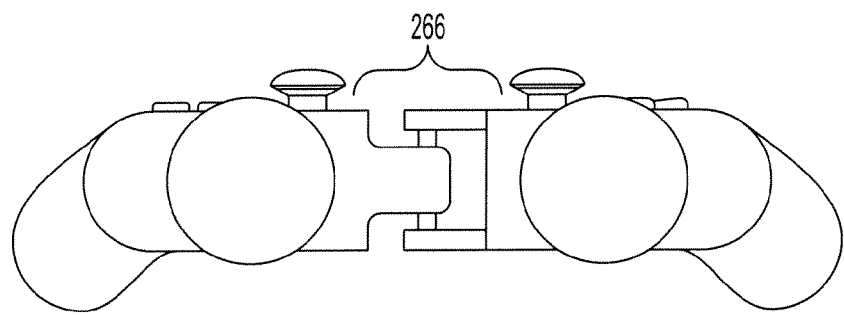

FIG. 13A is a top view of a controller 260 for interfacing with an interactive application, in accordance with an embodiment of the invention. The controller 260 includes a right portion 262 and a left portion 264 joined by a u-joint 266. The u-joint 266 enables to right portion 262 and the left portion 264 to be swiveled about each other while remaining connected to each other. FIG. 13B is a front view of the controller 260. In one embodiment, each of the right portion 262 and left portion 264 includes a reference object that can be visual tracked. In one embodiment, the controller 260 includes sensors for determining the orientation of the u-joint so as to determine the relative orientation of the right portion 262 and the left portion 264 to each other. The relative orientation of the right portion 262 and the left portion 264 to each other can to utilized as an input for an interactive application.

FIG. 14 illustrates a system for interacting with a video game, in accordance with an embodiment of the invention. The system includes a computing device 270 which executes a video game 272. It will be appreciated that the computing device 270 may be any of various types of devices, such as a console gaming system, a general purpose computer, a desktop personal computer, laptop, tablet computer, networked display, server computer, or any other type of computing device capable of executing a video game. In various embodiments, the computing device 270 can be locally situated, or remotely situated and accessible via a network (not shown). The video game 272 receives various types of inputs, and outputs audio and video data to an audio/video renderer 284, which renders audio and video to a television 292.

The system also includes a hybrid separable motion controller that is defined by a first controller portion 294 and a second controller portion 310. The first controller portion includes a processor 296 for executing program instructions. Inputs 298 can include various types of input devices, such as buttons, a joystick, a d-pad, triggers, accelerometers, gyroscopes, magnetometer, etc. A communications module 300 enables the first controller portion 294 to communicate wirelessly with the console 270. A connection sensor 302 detects whether the first controller portion 294 is connected to the second controller portion 310. The first controller portion 294 includes a link 304 which connects to a corresponding link 320 of the second controller portion 310 to facilitate communication between the two controller portions. A visual marker 306 can be tracked via optical recognition to facilitate tracking of the location and movement of the first controller portion 294. Also, feedback module 308 provides feedback from the video game to the user, for example, via a mechanism such as audio output or vibration of the first controller portion 294.

Similar to the first controller portion 294, the second controller portion includes corresponding features, such as a processor 312, various inputs 314, and communications module 316. Also provided are a connection sensor 318, a link 320, a visual marker 322, and feedback module 324. In one embodiment, the first controller portion 294 and the second controller portion 310 can also communicate wirelessly with each other via their respective communications modules 304 and 316.

When activated, a camera 290 captures an image stream of the first and second controller portions 294 and 310, and the image stream is analyzed by a visual tracking module 274 to track the location of the visual markers 306 and 322, and provide this information as input to the video game 272. Additionally, sensor inputs module 276 receives data from sensors such as accelerometers, gyroscopes, and magnetometers of the controller portions. This data can be utilized in conjunction with the image stream to enhance the tracking of the visual markers, and also provides information regarding the orientation and movement of the controller portions to the video game 272. Button/joystick input module 278 receives input data from the buttons or joysticks or triggers of the controller portions, and exposes this data as input to the video game.

A controller configuration detection module 280 determines whether the hybrid separable motion controller is in a connected configuration wherein the controller portions are connected to each other, or in a disconnected configuration wherein the controller portions are disconnected from each other. Based on this determination, a mode setting trigger 282 determines a mode of operation for the controller. Various modes of operation are contemplated regarding the manner in which the controller portions are configured for interaction with the video game based on the determined configuration of the controller.

For example, when the controller is in a connected configuration, visual tracking of the visual markers may be inactive. Whereas when connection of the controller portions to each other is detected, then visual tracking of the visual markers may be activated by the mode setting trigger 282. In other embodiments, the operational mode set based on the detected configuration of the separable controller may adjust the manner in which a particular input is provided to the video game. For example, when switching from a connected configuration to a disconnected configuration, an input based on operating an input mechanism such as buttons, triggers, or a joystick, may switch to a mode wherein the input is based on motion of one or more of the controller portions. In other embodiments, the particular operational mode correlated to the connected and disconnected configurations may vary depending on the stage of the video game 272 or user preferences. Any of various types of operational modes are contemplated which determine how the operation of the controller defines input for the video game 272.

As the video game 272 executes, it generates controller feedback 286, which is communicated to the controller portions 294 and 310 for rendering by their respective feedback modules 208 and 324. The controller feedback can include data defining vibration feedback parameters, audio output, etc.

Figure 15:
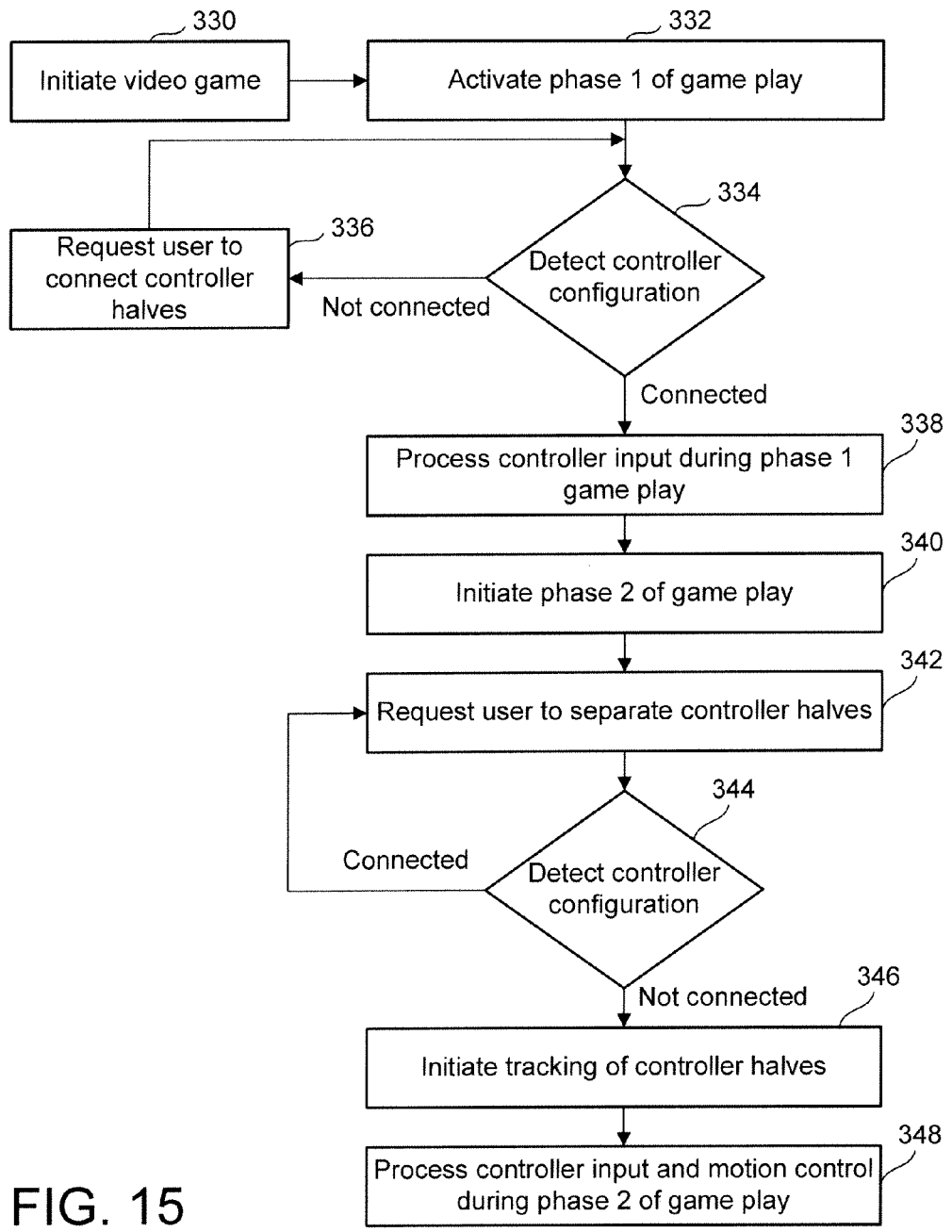
FIG. 15 illustrates a method for providing interactivity with a video game, in accordance with an embodiment of the invention.

FIG. 15 illustrates a method for providing interactivity with a video game, in accordance with an embodiment of the invention. At method operation 330, the video game initiates. At method operation 332, a first phase of gameplay is activated. At method operation 334, the controller configuration is detected. If the controller is determined to be in a disconnected configuration, then at method operation 336, the user is requested to connect the controller halves before proceeding with the first phase of gameplay. After detecting that the controller is in a connected configuration, then at method operation 338, the controller input is processed during the first phase of gameplay. After completion of the first phase of gameplay, at method operation 340 a second phase of gameplay is initiated. At method operation 342, the user is requested to separate the controller halves, and at method operation 344, the controller configuration is detected. When the controller is determined to be in a disconnected configuration, then at method operation 346, tracking of the controller halves is initiated. At method operation 348, controller input as well as motion input based on the tracked controller halves is processed during the second phase of gameplay.

Figure 16:
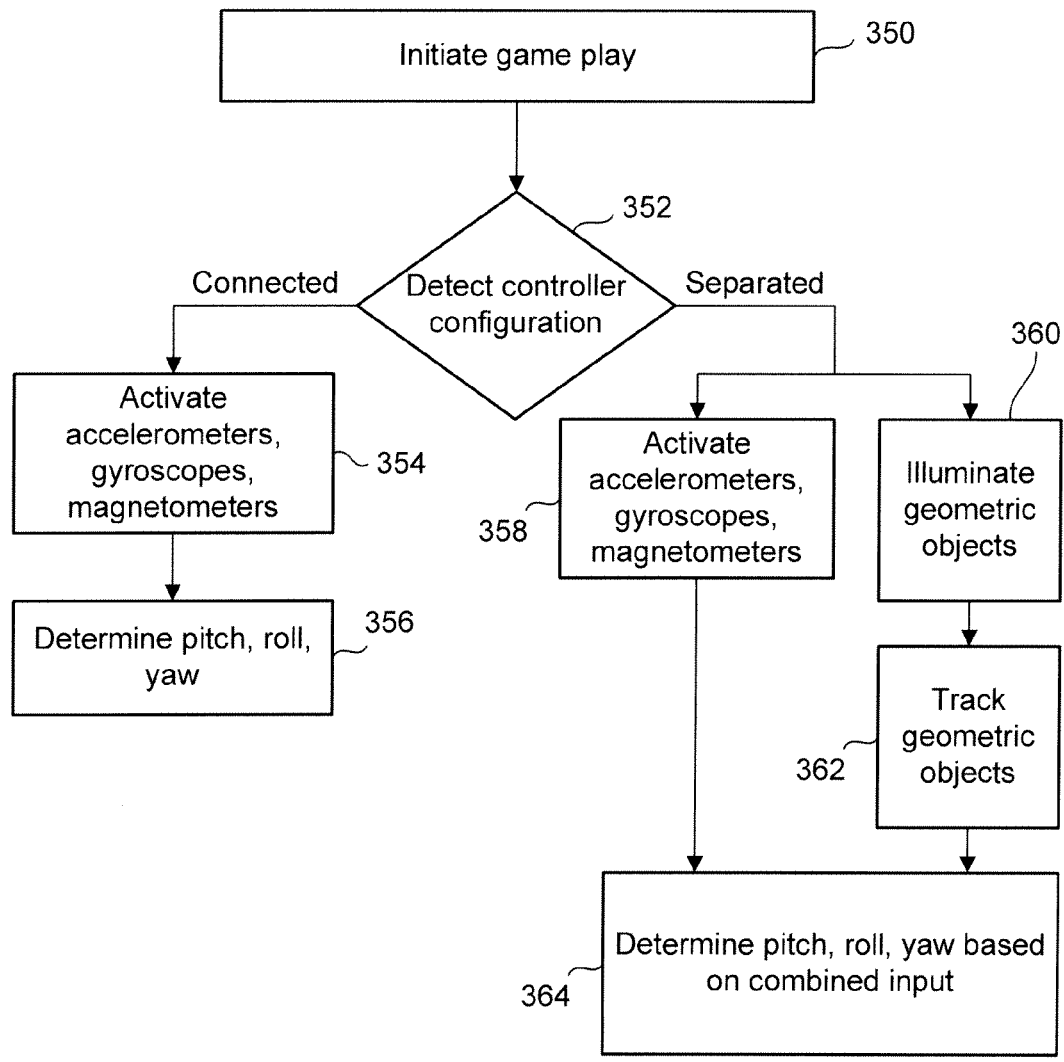
FIG. 16 illustrates a method for determining pitch, roll, and yaw based on controller configuration, in accordance with an embodiment of the invention.

FIG. 16 illustrates a method for determining pitch, roll, and yaw based on controller configuration, in accordance with an embodiment of the invention. At method operation 350, gameplay of a video game is initiated. Then the controller configuration is detected at method operation 352. If the controller is determined to be in a connected configuration, then at method operation 354, various motion sensors of the controller are activated, such as accelerometers, gyroscopes, or magnetometers. At method operation 356, the pitch, roll, and yaw of the controller are determined based on data from the motion sensors. If the controller is determined to be in a separated or disconnected configuration, then at method operation 358, the aforementioned motion sensors are activated, too. Additionally, at method operation 360 geometric objects of the controller portions are illuminated, and at method operation 362, the illuminated geometric objects are tracked. At method operation 364, both the data from the motion sensors, and the tracked location and movement of the geometric objects are used in a combined fashion to determine pitch, roll, and yaw values for the controller overall.

Figure 17:
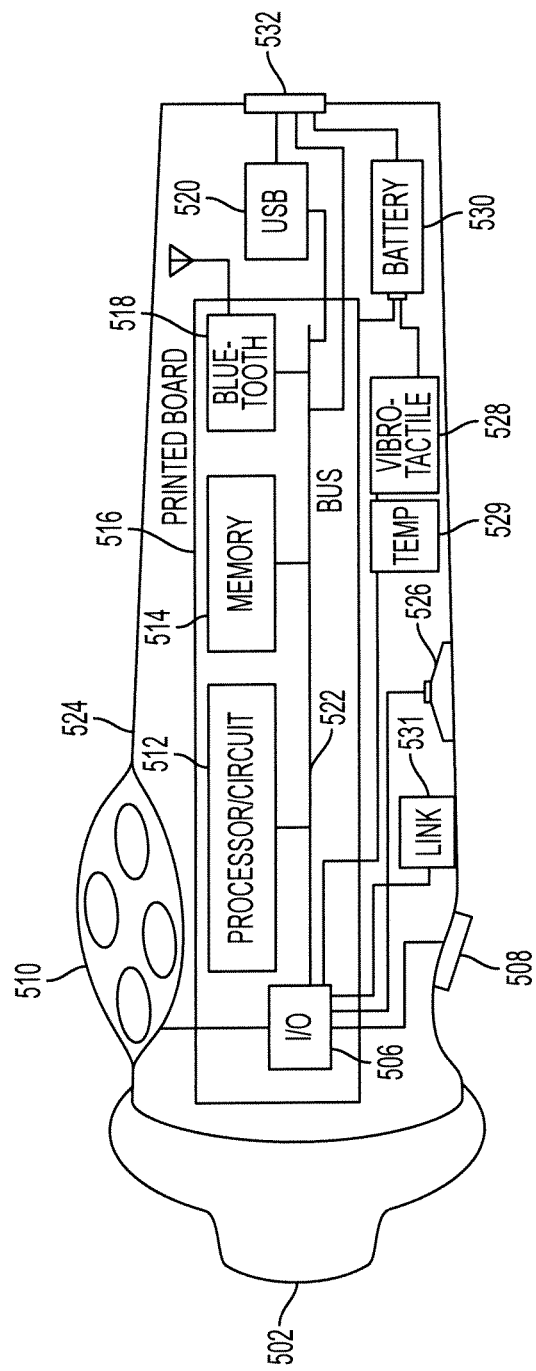
FIG. 17 illustrates the components of a handle of a controller portion with an expansion connector, in accordance with an embodiment of the invention.

It will be apparent that a controller portion as herein described may have various forms and features. In one embodiment, a controller portion may consist of a handle and a separate attachment which provides expanded capabilities. FIG. 17 illustrates the components of a handle 524 of a controller portion with expansion connector 502, in accordance with an embodiment of the invention. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 524 is configured to be held by a user operating the controller portion with a single hand. A user's second hand may, of course, be used to hold or select buttons on handle 524. A user holding the controller portion can provide input by pressing buttons, such as top button 510 and bottom button 508. In one embodiment input can also be provided by moving the controller portion within a three-dimensional space when an attachment is coupled to handle 524, such as the one shown in FIG. 19A. The controller portion is configured to operate wirelessly, which facilitates freedom of controller movement in order to interact with a computer or console. Wireless communication can be achieved in multiple ways, such as via Bluetooth® wireless link, WiFi, infrared (not shown) link, etc.

Attachments providing expanded capabilities to handle 524 are connected and disconnected to expansion connector 502. In one embodiment, an attachment enables the base computing device to locate the combination of handle and attachment within a three-dimensional space via visual recognition of images taken by a camera. Other embodiments provide additional communication capabilities to the controller, such as an attachment that provides ultrasonic communication with the base computer or with other controllers in the field of play. In yet another embodiment, an attachment provides infrared capabilities to allow the controller to communicate via infrared frequencies with the base computer, or to use the controller as a remote control for a TV or other electronic equipment.

In one embodiment, the attachment communicates directly with the computer and can act upon commands received from the computer, such as turning on an internal light or emitting a sound. In another embodiment, the attachment is directly controlled by handle 524 and the attachment only reacts to commands from handle 524. In yet another embodiment, the attachment can react to commands received from the computer or from the handle.

Inside handle 524, printed circuit board 516 holds processor 512, Input/Output (I/O) module 506, memory 516, and Bluetooth module 518, all interconnected by bus 522. A Universal Serial Bus (USB) module 520 also provides interactivity with the base computing device, or with other devices connected to USB port 532. The USB port can also be used to charge the rechargeable battery 530. Vibrotactile feedback is provided by vibrotactile module 528, and thermal feedback is provided by temperature module 529. Speaker 526 provides audio output. Link 531 connects to a corresponding link of another controller portion, to facilitate communication between both controller portions.

Note that the above controller portion configuration is exemplary and many modifications thereto, including eliminating or adding modules, would occur to a person of ordinary skill in the art with access to the present Specification, and is well within the scope of the claimed invention. For example, the controller can also include sensors for mechanical tracking of the controller portion's movement.

Figure 18:
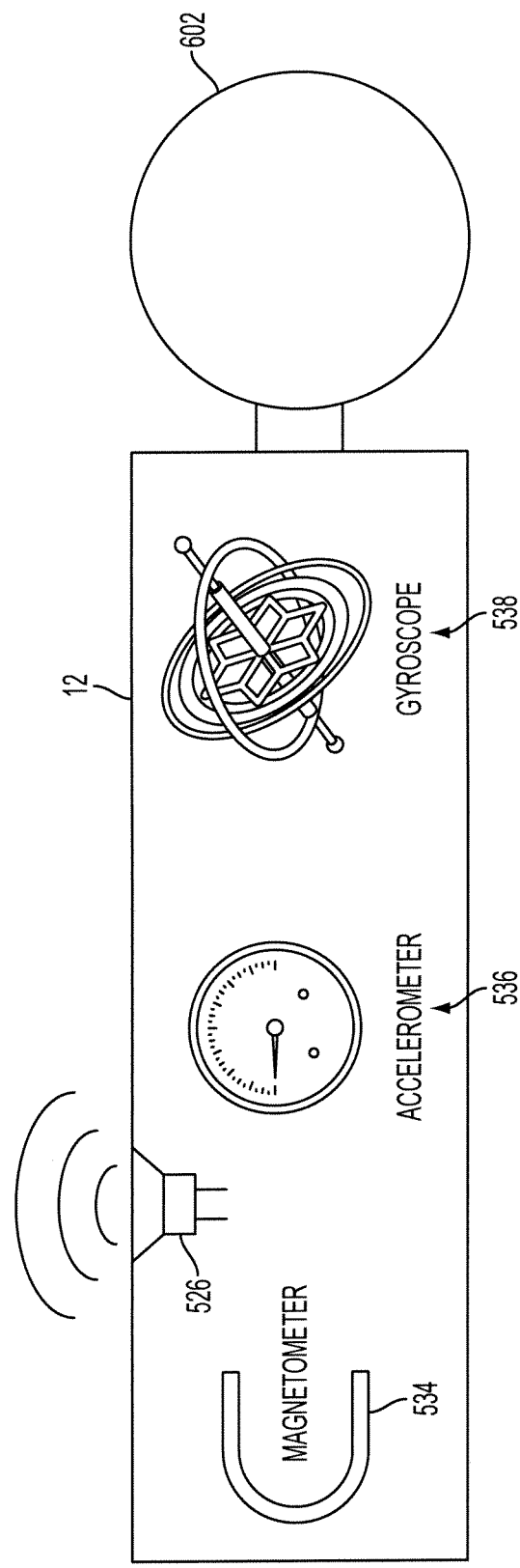
FIG. 18 depicts a controller portion with sensors for improving movement tracking, according to one embodiment.

FIG. 18 depicts a controller portion 12 with sensors for improving movement tracking, according to one embodiment. Different embodiments include different combinations of sensors, such as magnetometers 534, accelerometers 536, gyroscopes 538, etc. An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 536 are used to provide the direction of gravity, which gives an absolute reference for 2 angles (world-space pitch and world-space roll). Controllers can suffer accelerations exceeding 5 g, therefore accelerometers able to operate with forces exceeding 5 g are used inside controller 100.

A magnetometer measures the strength and direction of the magnetic field in the vicinity of the controller. In one embodiment, three magnetometers 534 are used within the controller, ensuring an absolute reference for the world-space yaw angle. The magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from the gyros (see below) or the camera. In one embodiment, accelerometer 536 is used together with magnetometer 534 to obtain the inclination and azimuth of the controller.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires, resetting the gyroscopes periodically, which can be done using other available information, such as positional/orientation determination based on visual tracking of the display 106, accelerometer, magnetometer, etc. A hand-held device can rotate faster than 500 degrees/sec, so a gyroscope with a spec of more than 1000 degrees/sec is recommended, but smaller values are also possible.

Figure 19A:
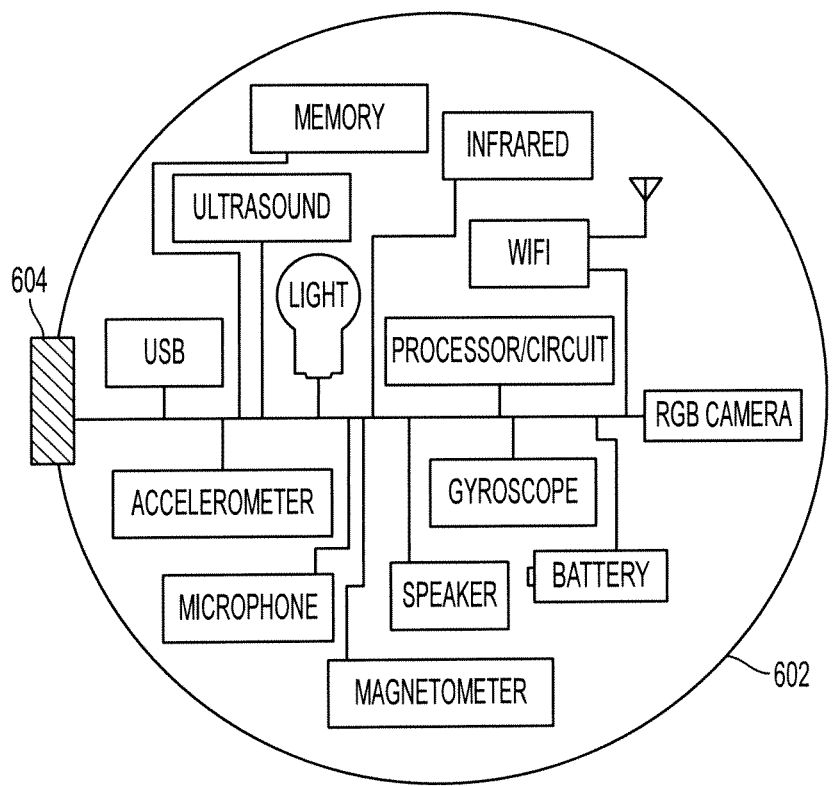
FIG. 19A depicts an attachment for a handle with a "rich" feature set, in accordance with an embodiment of the invention.

FIG. 19A depicts an attachment 602 for the handle 524 with a "rich" feature set. It should be appreciated that the embodiment illustrated in FIG. 19A is exemplary and other embodiments may include a subset of the features of attachment 602. The embodiment illustrated in FIG. 19A should therefore not be interpreted to be exclusive or limiting, but rather exemplary or illustrative.

The different modules in spherical attachment 602 are interconnected via a common bus, but other interconnection mechanisms are possible. Connector 604 provides the interface to connect or disconnect attachment 602 from the controller. Attachment 602 includes a processor or circuit plus memory allowing the attachment to process computer instructions. Further, attachment 602 includes communication modules such as ultrasound, infrared, and WiFi. Such communications enable the attachment to communicate with the computer or other electronic devices, which is referred to herein as a communications interface between the controller and the computer or any other electronic device. In one embodiment, the attachment operates as a modem by receiving information from the controller and forwarding the information to the computer, and vice versa.

Information received by the attachment and passed to the controller is used to change the state of the controller. For example, the controller may emit a sound, change button configuration, disable the controller, load registers in memory, send a command to the attachment to light up, etc. The information received by the computer is used by the interactive program to update the state of the interactive program. For example, the interactive program may move an avatar on the screen or change the status of the avatar, fire a weapon, start a game, select an option in a menu, etc.

An accelerometer, a magnetometer and a gyroscope provide mechanical information related to the movement of the attachment. In one embodiment, the mechanical or inertial information is combined with other location determination information, such as visual tracking of the display, in order to refine the determination of the location of the controller-attachment combo.

An internal light emitting device allows the attachment to be lit from the inside to provide user feedback. In one embodiment, light emitting device can emit light of a single color, and in another embodiment, light emitting device can be configured to emit light from a choice of colors. In yet another embodiment, attachment 602 includes several light emitting devices, each device being capable of emitting light of one color. The light emitting device is configurable to emit different levels of brightness. The computer can provide interactivity to the user holding the controller by changing the light emitting status of attachment 602, producing audio signals, or with vibrotactile feedback, etc. One feedback operation or a combination of feedback operations is possible. In one embodiment, the type of feedback is selected from a list of predefined interactivity, and based on what is occurring in a game.

A microphone and a speaker provide audio capabilities, while a battery powers the rest of the components, including the processor and the light emitting device. The battery can also be used by the handle as a second source of power. For example, if the rechargeable battery in the controller is discharged, the attachment can provide the required power so the user can continue playing instead of having to stop to recharge the controller. In one embodiment, attachment 602 does not include the battery and power to the modules in attachment 602 is obtained via an electrical connection with the power source of the handle.

A USB module allows USB communication to and from the attachment. In one embodiment, the USB connection is used to charge the battery in the attachment. In yet another embodiment, attachment 602 includes files in memory that are transferred to the controller, or to the computer, or to both the controller and the computer. The files in memory can include configuration files or programs that are transferred for execution in the controller or the gaming system. The files can be used to identify a specific user, to configure the controller or the base system, to load a game, to add features to existing games, etc. For example, one file is a game that is loaded to the computer for playing, another file contains karaoke songs that can be used in a sing-along game, another file contains new player rosters and statistics for an update to a sports game, etc. In addition, the attachment can be used to store user parameters, such as player configuration for a particular game. The player can then use the attachment in a different gaming system to play with other players using the configuration obtained from the original gaming system.

Figure 19B:
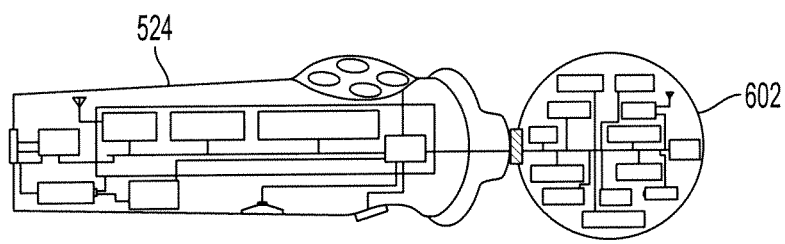
FIG. 19B illustrates an embodiment where the attachment of FIG. 19A is connected to the controller portion of FIG. 17.

FIG. 19B illustrates an embodiment where the attachment of FIG. 19A is connected to the controller portion of FIG. 17. In one embodiment, attachment 602 interacts with controller 524 via a communications interface, such as a USB interface. In another embodiment, attachment 602 is in electrical communication with one or several internal modules inside controller 524. For example, processor/circuit of attachment 602 (as seen in FIG. 19A) is connected to bus 522 of controller 524 (as seen in FIG. 17), thus allowing the processor of attachment 602 to communicate with the modules in the controller attached to the bus. The processor of attachment 602 can access memory 516 to write or read data directly, or generate interrupts for processor/circuit 512 of controller 524 to signal an external event which must be processed by processor 512.

It should be noted that the embodiment depicted in FIG. 19B is exemplary and other embodiments may include fewer components.

Furthermore, it will be noted that the attachment 602 may be permanently attached, or configured to be detachable. The attachment 602 can be a shaped object of various configurations. In one embodiment, the shaped object is formed from a piece (or pieces) of plastic. The piece of plastic can be a soft plastic, hard plastic, or of medium hardness. If the shape is defined from a moldable plastic, the shape can be forced into a particular configuration and the shape will stay. In another embodiment, the shape will always bounce back to its original shape if a user squeezes or presses on the shape, during, before, or after using a controller having a shaped object.

In still another embodiment, the shaped object is constructed from a translucent plastic material. The translucent plastic material is configured so that any light generated within the shaped object will light up the shape. The light generated within the shaped object can be produced by any type of light generating device. In one embodiment the device is a light emitting diode. For any of the shaped objects described above and described in the following diagrams, the shaped object can be constructed from the translucent plastic material. The translucent plastic material can be defined by injection molding, or other suitable construction techniques. In other embodiments, the shaped object can be produced from a metallic material, such as aluminum or other metals. Still further, the shaped object can be defined from glass type materials, ceramics, or the like.

In one embodiment, a hand strap is coupled to the controller handle to provide a location for fingers of the user to be held beside the controller handle. For instance, if the user loses his or her grip on the controller body, the integrated hand strap will secure the controller to the users hand. In one embodiment, the integrated hand strap can be defined from a plastic material. The plastic material can be pliable, such as a rubberized or foam type material. In another embodiment, the integrated hand strap can be made from a cloth material, a polyester material, or a threaded material. In still another embodiment, the integrated hand strap can be made from a hard plastic material similar to that of the controller handle, if the controller handle is made from a hard plastic material. Buttons are provided on the controller handle at a location that provides ease of access to a user when interfacing with the controller device. For instance, the controller buttons can include typical gaming-type buttons to allow press operations, trigger operations, joystick operations, and the like.

As described above, the grip can be defined from any number of materials that will provide softness, pliability, and comfort for users that utilize the controller. The controller will also include buttons on at least one side. Additionally, the controller can include a trigger button on at least one side. The gripping material can be provided by applying a layer over the controller body or can be defined integrally with the controller body. At one and of the controller body, the shaped location is defined. The shaped location is generically illustrated to emphasize that any shape of the shaped object can be provided and integrated with the controller. The shape of the controller and of the shaped object will thus take on the form most suitable to the desired configuration, and thus design that is most pleasing to the designer.

The gripping material can be applied to the controller handle or can be integral with the controller handle. The gripping material and the controller handle can have a contoured shape to allow users to hold more comfortably the controller body. In one embodiment, the controller handle can include no buttons whatsoever. In another embodiment, the controller handle can include a plurality of buttons and can be disposed at locations on the controller handle that are most efficient for user access. The shaped location can thus be connected to an end of the controller handle.

Figure 19C:
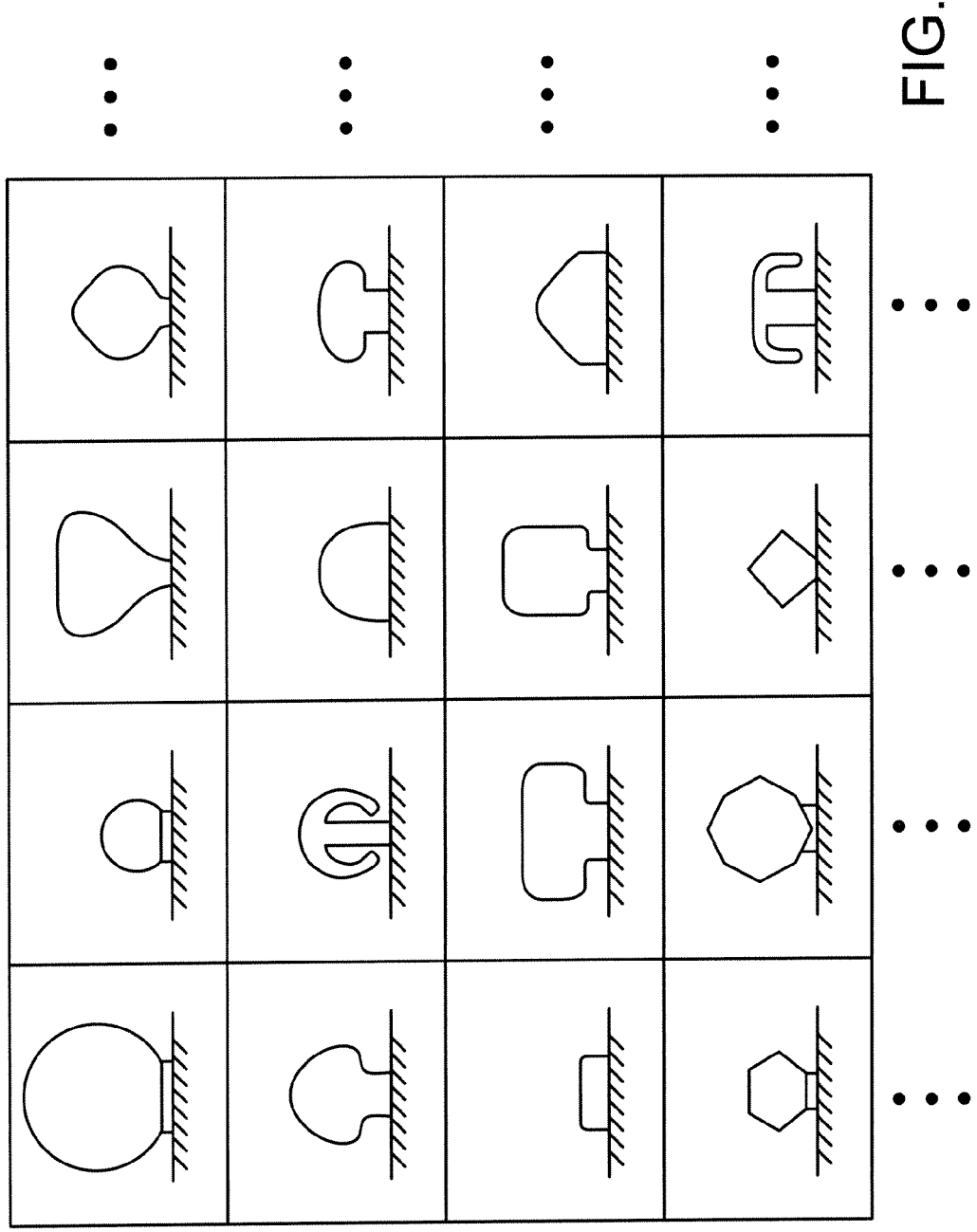
FIG. 19C illustrates cross-section views of various possible shapes which the shaped object may have, in accordance with embodiments of the invention.

FIG. 19C illustrates cross-section views of various possible shapes which the shaped object may have, in accordance with embodiments of the invention. It will be understood by those skilled in the art that the illustrated embodiments are shown merely by way of example, as the shaped object may have any of various other shapes, sizes, and configurations to facilitate visual tracking in accordance with embodiments of the invention described herein.

While embodiments of the invention have generally been described as including reference objects for visual tracking, it will be understood by those skilled in the art that hybrid separable controllers as described may incorporate or utilize any of various other types of motion tracking technologies, such as that described in U.S. patent application Ser. No. 12/623,352, entitled "CONTROLLER FOR INTERFACING WITH A COMPUTING PROGRAM USING POSITION, ORIENTATION, OR MOTION," filed Nov. 20, 2009, by inventors Xiadong Mao and Noam Rimon, the disclosure of which is herein incorporated by reference in its entirety.

Figure 20:
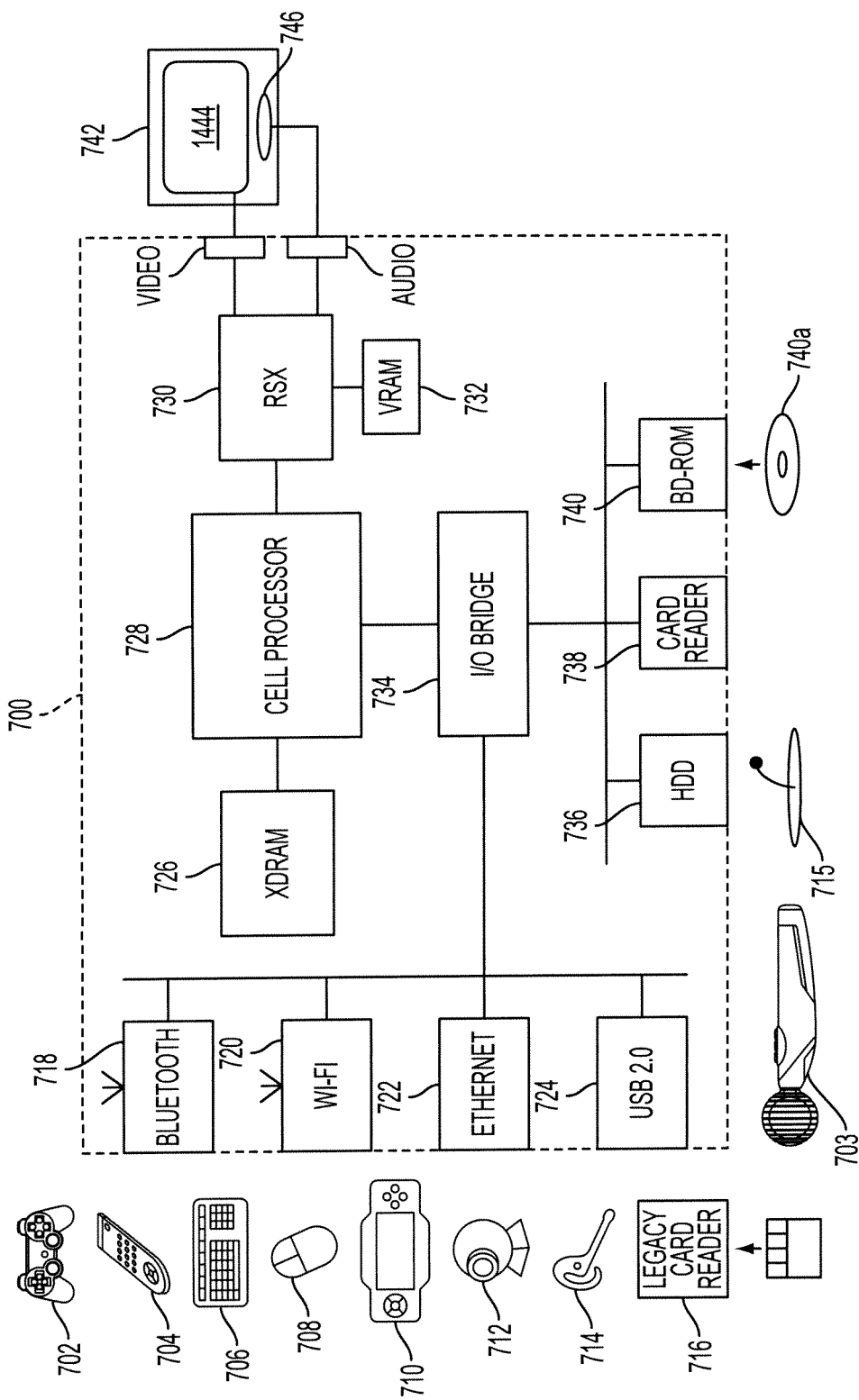
FIG. 20 illustrates hardware and user interfaces that may be used to provide interactivity with a video game, in accordance with one embodiment of the present invention.

FIG. 20 illustrates hardware and user interfaces that may be used to provide interactivity with a video game, in accordance with one embodiment of the present invention. FIG. 20 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby®5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 21:
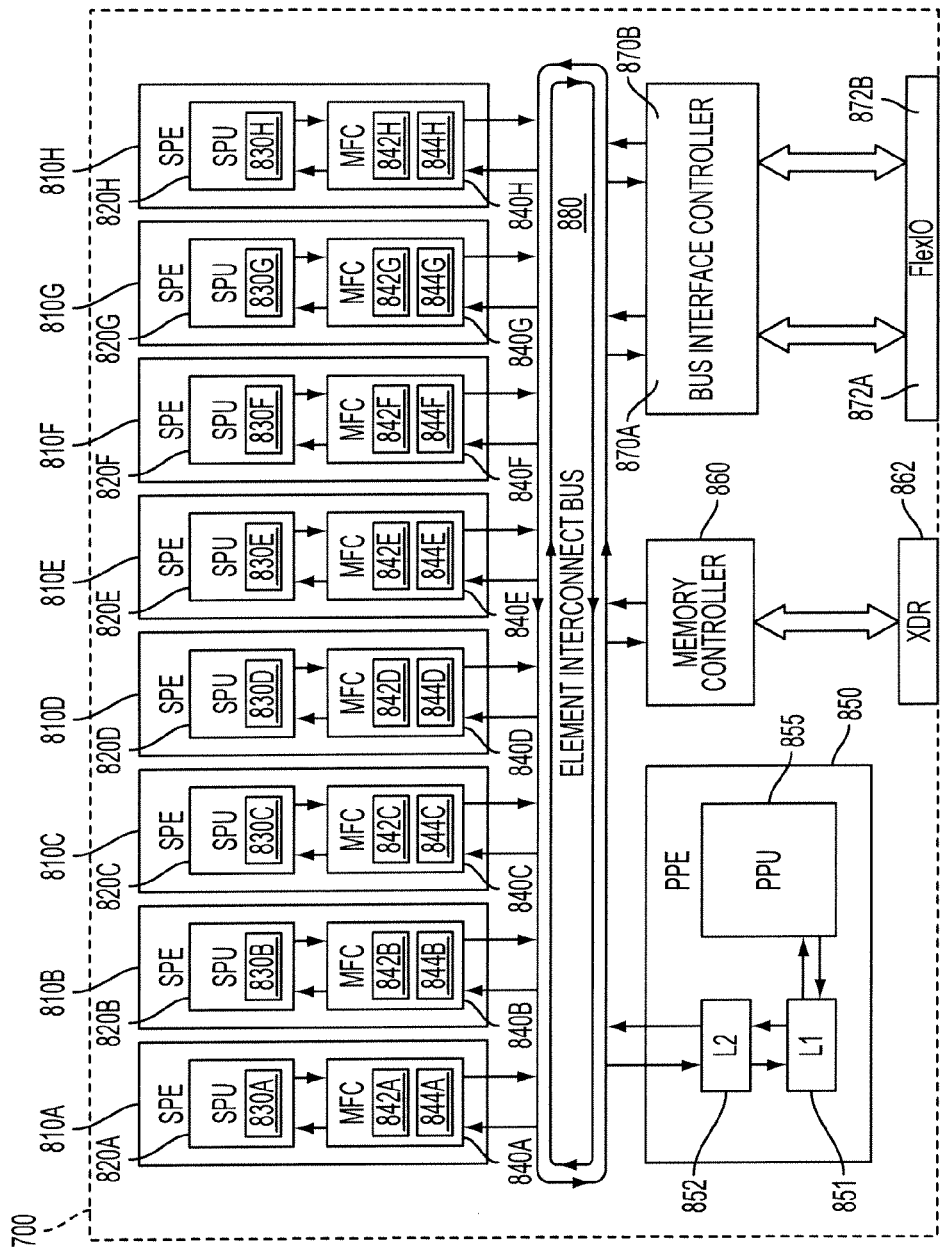
FIG. 21 illustrates additional hardware that may be used to process instructions, in accordance with one embodiment of the present invention.

FIG. 21 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8

16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 22:
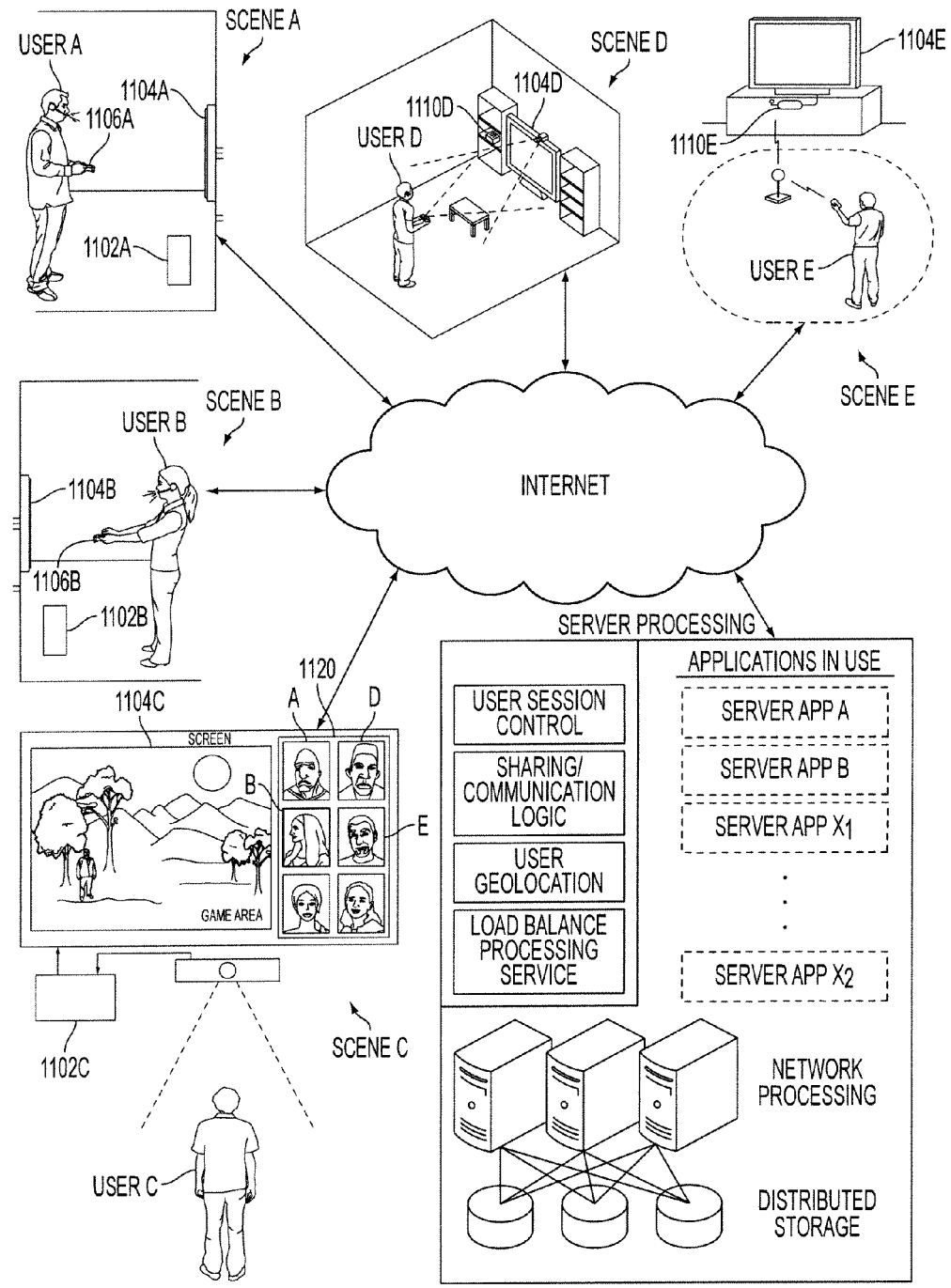
FIG. 22 is an exemplary illustration of scene A through scene E with respective user A through user E interacting with game clients 1102 that are connected to server processing via the internet, in accordance with one embodiment of the present invention.

FIG. 22 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VoIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Figure 23:
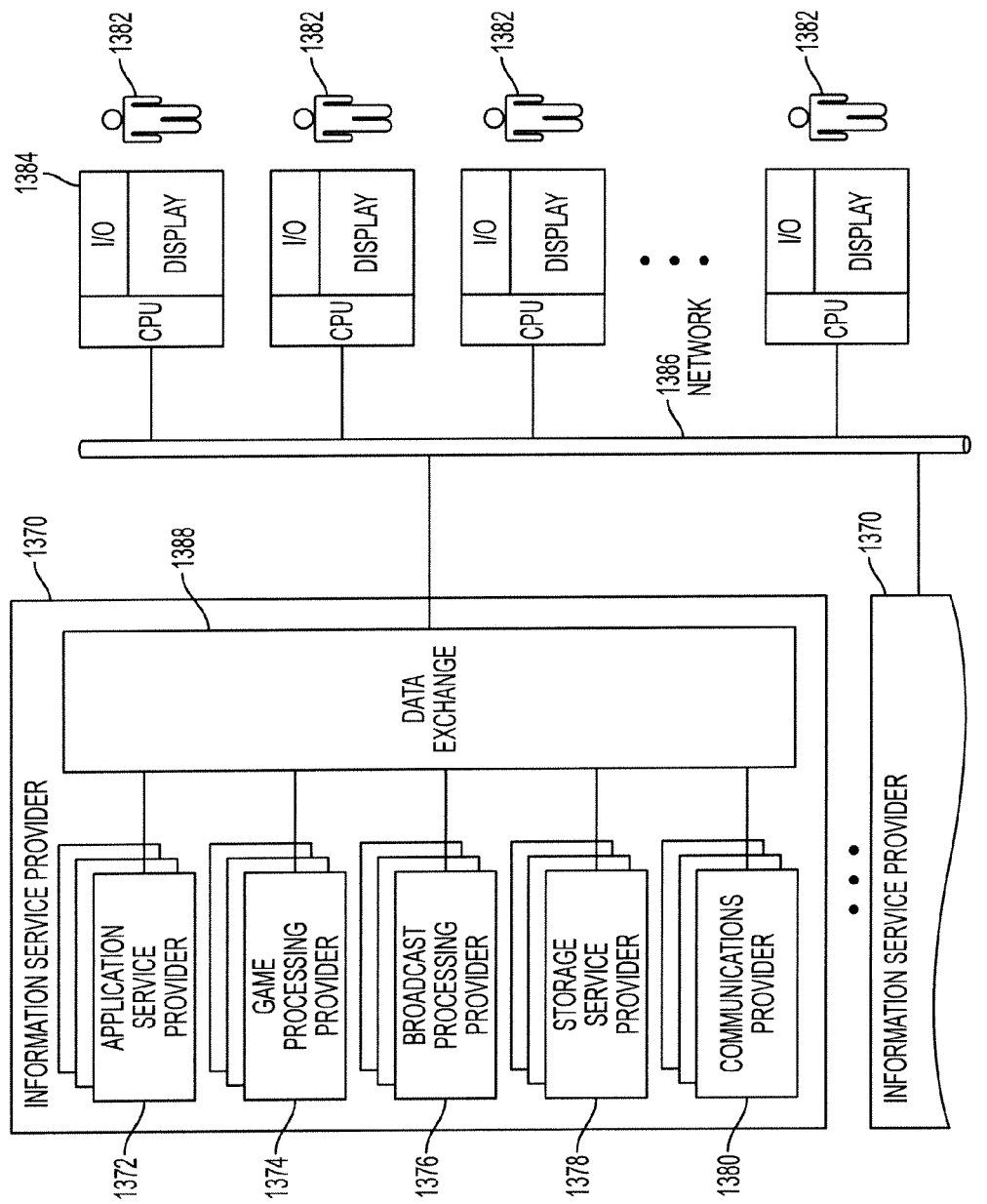
FIG. 23 illustrates an embodiment of an Information Service Provider architecture.

Within scene A of FIG. 23, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 17 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

FIG. 23 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller for interacting with a video game, comprising:
   a first portion including a first handle, and a first geometric object defined at an end of the first handle;
   a second portion including a second handle and a second geometric object defined at an end of the second handle;
   wherein the first portion or the second portion includes a connection sensor for determining whether the controller is in a connected configuration defined by joining of the first portion and the second portion, or a disconnected configuration defined by non-joining of the first portion and the second portion; and
   wherein the first geometric object and the second geometric object are positioned substantially adjacent to each other when the controller is in the connected configuration;
   wherein the connected configuration triggers determination of an input value based on at least one internal motion sensor of the first portion or the second portion;
   wherein the disconnected configuration triggers determination of the input value based on a combination of independently tracked locations of the first and second geometric objects.

2. The controller of claim 1,
   wherein the first portion includes a first communications interface;
   wherein the second portion includes a second communications interface that links to the first communications interface when the controller is in a connected configuration to define a communications pathway between the first portion and the second portion.

3. The controller of claim 1,
   wherein the first geometric object includes a first illumination source for illuminating the first geometric object;
   wherein the second geometric object includes a second illumination source for illuminating the second geometric object.

4. The controller of claim 3, wherein the connection sensor triggers activation of the first and second illumination sources when the controller is determined to be in a disconnected configuration.

5. The controller of claim 3,
   wherein the first illumination source includes a first LED;
   wherein the second illumination source includes a second LED configured to emit a different color than the first LED.

6. The controller of claim 3,
   wherein the first portion includes a first light controller for controlling the first illumination source; and
   wherein the second portion includes a second light controller for controlling the second illumination source.

7. The controller of claim 1, wherein the first portion and second portion each include at least one input mechanism selected from the following: a button, a joystick, a directional pad, a trigger, a touchpad, an accelerometer, a gyroscope, a magnetometer.

8. The controller of claim 7, wherein the connection sensor triggers a change in an assignment of the input mechanism of the first portion or the second portion when a change between the connected configuration and the disconnected configuration is detected.

9. The controller of claim 1,
wherein the first portion includes a first magnet; and
wherein the second portion includes a second magnet for coupling to the first magnet when the controller is in the connected configuration.

10. The controller of claim 1,
wherein the first portion includes an alignment hole; and
wherein the second portion includes an alignment pin for interfacing with the alignment hole when the controller is in the connected configuration.

11. The controller of claim 1,
wherein first portion includes a third geometric object defined at an end of the first handle opposite that of the first geometric object;
wherein the second portion includes a fourth geometric object defined at an end of the second handle opposite that of the second geometric object.

12. The controller of claim 11,
wherein the third geometric object includes a first illumination source for illuminating the third geometric object;
wherein the fourth geometric object includes a second illumination source for illuminating the fourth geometric object.

13. A controller for interfacing with a video game, comprising:
a first portion including a first handle, and a first geometric object defined at an end of the first handle, the first geometric object including a first illumination source for illuminating the first reference object;
a second portion including a second handle, and a second geometric object defined at an end of the second handle, the second geometric object including a second illumination source for illuminating the second geometric object;
wherein the first portion or the second portion includes a connection sensor for determining whether the controller is in a connected configuration defined by joining of the first portion and the second portion, or a disconnected configuration defined by non-joining of the first portion and the second portion;
wherein when the connection sensor determines the controller is in a connected configuration, at least one internal motion sensor of the first portion or the second portion defines an input value for the video game;
wherein when the connection sensor determines the controller is in a disconnected configuration, the input value is defined by a combination of independently tracked locations of the first and second geometric objects.

14. The controller of claim 13,
wherein the first portion includes a first communications interface;
wherein the second portion includes a second communications interface that links to the first communications interface when the controller is in a connected configuration to define a communications pathway between the first portion and the second portion.

15. The controller of claim 13, wherein the connection sensor triggers activation of the first and second illumination sources when the controller is determined to be in a disconnected configuration.

16. The controller of claim 13,
wherein the first illumination source is configured to emit a first color;
wherein the second illumination source is configured to emit a second color different than the first color.

17. A controller for interfacing with a video game, comprising:
a first portion including a first handle, and a first geometric object defined at an end of the first handle, the first geometric object including a first illumination source for illuminating the first geometric object;
a second portion including a second handle, and a second geometric object defined at an end of the second handle, the second geometric object including a second illumination source for illuminating the second geometric object;
wherein the first portion or the second portion includes a connection sensor for determining whether the controller is in a connected configuration defined by joining of the first portion and the second portion, or a disconnected configuration defined by non-joining of the first portion and the second portion;
wherein the first portion includes a first light controller for controlling the first illumination source to emit a first color; and
wherein the second portion includes a second light controller for controlling the second illumination source to emit a second color different than the first color;
wherein the connection sensor triggers a change in an assignment of an input mechanism of the first portion or the second portion when a change between the connected configuration and the disconnected configuration is detected.

18. The controller of claim 17, wherein the connection sensor triggers activation of the first and second illumination sources when the controller is determined to be in a disconnected configuration.

19. The controller of claim 17,
wherein first portion includes a third geometric object defined at an end of the first handle opposite that of the first geometric object, the third geometric object including a third illumination source for illuminating the third geometric object;
wherein the second portion includes a fourth geometric object defined at an end of the second handle opposite that of the second geometric object, the fourth geometric object including a fourth illumination source for illuminating the fourth geometric object.

20. A controller for interacting with a video game, comprising:
a first portion including a first handle, and a first object defined at an end of the first handle;
a second portion including a second handle, and a second object defined at an end of the second handle;
wherein the first portion or the second portion includes a connection sensor for determining whether the controller is in a connected configuration defined by joining of the first portion and the second portion, or a disconnected configuration defined by non-joining of the first portion and the second portion; and
wherein the first object and the second object are positioned substantially adjacent to each other when the controller is in the connected configuration;
wherein the first object includes a first illumination source for illuminating the first object;
wherein the second object includes a second illumination source for illuminating the second object;
wherein the connection sensor triggers activation of the first and second illumination sources when the controller is determined to be in a disconnected configuration;

wherein the connection sensor triggers a change in input values used by the first portion or the second portion when a change between the connected configuration and the disconnected configuration is detected.

21. The controller of claim 20,
wherein the first illumination source is a first LED;
wherein the second illumination source is a second LED.

\* \* \* \* \*